United States Patent
Blevins et al.

(10) Patent No.: US 10,423,127 B2
(45) Date of Patent: Sep. 24, 2019

(54) VELOCITY BASED CONTROL IN A NON-PERIODICALLY UPDATED CONTROLLER

(71) Applicant: FISHER-ROSEMOUNT SYSTEMS, INC., Round Rock, TX (US)

(72) Inventors: Terrence L. Blevins, Round Rock, TX (US); Mark J. Nixon, Round Rock, TX (US); Pete Stoltenow, Marshalltown, IA (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 511 days.

(21) Appl. No.: 15/081,189

(22) Filed: Mar. 25, 2016

(65) Prior Publication Data

US 2016/0209815 A1    Jul. 21, 2016

Related U.S. Application Data

(63) Continuation-in-part of application No. 13/351,802, filed on Jan. 17, 2012, now Pat. No. 9,298,176.
(Continued)

(51) Int. Cl.
G05B 13/02   (2006.01)

(52) U.S. Cl.
CPC .................... *G05B 13/02* (2013.01)

(58) Field of Classification Search
None
See application file for complete search history.

(56) References Cited

U.S. PATENT DOCUMENTS

| 3,628,129 A | 12/1971 | Riley |
| 4,149,237 A | 4/1979 | Freitas |

(Continued)

FOREIGN PATENT DOCUMENTS

| CN | 1142735 A | 2/1997 |
| CN | 1192813 A | 9/1998 |

(Continued)

OTHER PUBLICATIONS

Fayolle et al,, "An Analytic Evaluation of the Performance of the Send and Wait Protocol", IEEE Transactions on Communications, vol. 26, Issue 3, Mar. 1978 (pp. 313-319), retrieved from http://ieeexplore.ieee.org/document/1094065/ on Apr. 29, 2017.
(Continued)

*Primary Examiner* — Thomas C Lee
*Assistant Examiner* — Gary Collins
(74) *Attorney, Agent, or Firm* — Marshall, Gerstein & Borun LLP

(57) ABSTRACT

A technique for controlling a process using slow or non-periodically received process variable measurements enables more robust controller responses to setpoint changes and disturbance changes even when the process variable measurement feedback signals are reviewed at a rate on the order of the rate associated with the response time of the process dynamic or variable being controlled. The control technique implements iterations of a control routine to generate a control signal using a reset or rate contribution component that, in some sense, defines an expected process response to the control signal. When a new measurement of the process variable is unavailable to the controller, the reset or rate contribution component is maintained at zero or at some other previous level when generating the control signal. However, the reset contribution component is iteratively recalculated during each controller execution cycle, (Continued)

even when no new process variable measurement has been received, so that the output of the reset contribution component incorporates expected process changes that occur as a result of a setpoint or a feed-forward change that impacts the process input or control signal between the times that actual process variable measurement values are received at the controller. This technique makes the controller more robust when producing control signals in the presence of setpoint or feed-forward changes received between the times at which non-periodic process variable measurements are received at the controller and makes the controller operate better when the process variable feedback time interval is greater, equal to or on the order of the process response time.

37 Claims, 19 Drawing Sheets

Related U.S. Application Data

(60) Provisional application No. 62/240,322, filed on Oct. 12, 2015.

(56) References Cited

U.S. PATENT DOCUMENTS

| | | |
|---|---|---|
| 4,152,760 A | 5/1979 | Freitas et al. |
| 4,268,822 A | 5/1981 | Olsen |
| 4,303,973 A | 12/1981 | Williamson, Jr. et al. |
| 4,517,637 A | 5/1985 | Cassell |
| 4,539,655 A | 9/1985 | Trussell et al. |
| 4,726,017 A | 2/1988 | Krum et al. |
| 4,729,091 A | 3/1988 | Freeman et al. |
| 4,837,632 A | 6/1989 | Kubo et al. |
| 4,910,658 A | 3/1990 | Dudash et al. |
| 4,916,441 A | 4/1990 | Gombrich |
| 4,949,299 A | 8/1990 | Pickett |
| 5,088,021 A | 2/1992 | McLaughlin et al. |
| 5,099,444 A | 3/1992 | Wilson et al. |
| 5,142,550 A | 8/1992 | Tymes |
| 5,150,363 A | 9/1992 | Mitchell |
| 5,239,662 A | 8/1993 | Danielson et al. |
| 5,252,967 A | 10/1993 | Brennan, Jr. et al. |
| 5,268,834 A | 12/1993 | Sanner et al. |
| 5,268,835 A | 12/1993 | Miyagaki et al. |
| 5,307,297 A | 4/1994 | Iguchi et al. |
| 5,374,231 A | 12/1994 | Obrist |
| 5,400,246 A | 3/1995 | Wilson et al. |
| 5,400,253 A | 3/1995 | O'Connor |
| 5,451,923 A | 9/1995 | Seberger et al. |
| 5,477,449 A | 12/1995 | Iino et al. |
| 5,493,569 A | 2/1996 | Buchholz et al. |
| 5,495,482 A | 2/1996 | White et al. |
| 5,495,484 A | 2/1996 | Self et al. |
| 5,559,804 A | 9/1996 | Amada et al. |
| 5,581,247 A | 12/1996 | Kelly |
| 5,583,757 A | 12/1996 | Baca, Jr. et al. |
| 5,586,305 A | 12/1996 | Eidson et al. |
| 5,612,890 A | 3/1997 | Strasser et al. |
| 5,657,317 A | 8/1997 | Mahany et al. |
| 5,664,005 A | 9/1997 | Emery et al. |
| 5,666,530 A | 9/1997 | Clark et al. |
| 5,682,476 A | 10/1997 | Tapperson et al. |
| 5,691,896 A | 11/1997 | Zou et al. |
| 5,739,416 A | 4/1998 | Hoenk |
| 5,793,963 A | 8/1998 | Tapperson et al. |
| 5,867,384 A * | 2/1999 | Drees ............... G05B 5/01 700/42 |
| 6,043,461 A | 3/2000 | Holling et al. |
| 6,094,602 A | 7/2000 | Schade, III |
| 6,129,449 A | 10/2000 | McCain et al. |
| 6,199,018 B1 | 3/2001 | Quist et al. |
| 6,236,334 B1 | 5/2001 | Tapperson et al. |
| 6,246,320 B1 | 6/2001 | Monroe |
| 6,285,966 B1 | 9/2001 | Brown et al. |
| 6,298,454 B1 | 10/2001 | Schleiss et al. |
| 6,437,692 B1 | 8/2002 | Petite et al. |
| 6,628,579 B2 | 9/2003 | Watanabe et al. |
| 6,775,707 B1 | 8/2004 | Bennett et al. |
| 6,970,183 B1 | 11/2005 | Monroe |
| 7,158,851 B2 | 1/2007 | Funk |
| 7,436,797 B2 | 10/2008 | Shepard et al. |
| 7,460,865 B2 | 12/2008 | Nixon et al. |
| 7,519,012 B2 | 4/2009 | Tapperson et al. |
| 7,587,252 B2 | 9/2009 | Blevins et al. |
| 7,620,460 B2 | 11/2009 | Blevins et al. |
| 7,933,594 B2 | 4/2011 | Nixon et al. |
| 7,945,339 B2 | 5/2011 | Blevins et al. |
| 8,144,622 B2 | 3/2012 | Shepard et al. |
| 8,250,667 B2 | 8/2012 | Svensson et al. |
| 8,396,060 B2 | 3/2013 | Nagashima et al. |
| 8,719,327 B2 | 5/2014 | Blevins et al. |
| 9,298,176 B2 | 3/2016 | Blevins et al. |
| 2002/0125998 A1 | 9/2002 | Petite et al. |
| 2002/0130846 A1 | 9/2002 | Nixon et al. |
| 2003/0043052 A1 | 3/2003 | Tapperson et al. |
| 2003/0093245 A1 | 5/2003 | Schmit |
| 2003/0099221 A1 | 5/2003 | Rhee |
| 2003/0149493 A1 | 8/2003 | Blevins et al. |
| 2003/0171827 A1 | 9/2003 | Keyes et al. |
| 2004/0015609 A1 | 1/2004 | Brown et al. |
| 2004/0103165 A1 | 5/2004 | Nixon et al. |
| 2004/0117766 A1 | 6/2004 | Mehta et al. |
| 2004/0215356 A1 | 10/2004 | Salsbury et al. |
| 2004/0260405 A1 | 12/2004 | Eddie et al. |
| 2005/0062677 A1 | 3/2005 | Nixon et al. |
| 2005/0130605 A1 | 6/2005 | Karschnia et al. |
| 2005/0267710 A1 | 12/2005 | Heavner et al. |
| 2005/0276233 A1 | 12/2005 | Shepard et al. |
| 2006/0074598 A1 | 4/2006 | Emigholz et al. |
| 2006/0077917 A1 | 4/2006 | Brahmajosyula et al. |
| 2006/0079967 A1 | 4/2006 | Roby et al. |
| 2006/0150191 A1 | 7/2006 | Masuda et al. |
| 2006/0287769 A1 | 12/2006 | Yanagita et al. |
| 2007/0010898 A1 | 1/2007 | Hosek et al. |
| 2007/0093918 A1 | 4/2007 | Blevins et al. |
| 2007/0112905 A1 * | 5/2007 | Blevins ............... G05B 11/42 708/833 |
| 2008/0082180 A1 * | 4/2008 | Blevins ............... G05B 11/42 700/29 |
| 2009/0024231 A1 * | 1/2009 | Ji ............... H04L 1/0036 700/67 |
| 2009/0299495 A1 * | 12/2009 | Blevins ............... G05B 11/42 700/28 |
| 2012/0123583 A1 | 5/2012 | Hazen et al. |
| 2013/0013091 A1 | 1/2013 | Cavalcanti et al. |
| 2013/0079899 A1 * | 3/2013 | Baramov ............... G05B 21/02 700/32 |
| 2013/0184837 A1 | 7/2013 | Blevins et al. |
| 2014/0359367 A1 * | 12/2014 | Friman ............... G05B 9/02 714/37 |

FOREIGN PATENT DOCUMENTS

| | | |
|---|---|---|
| CN | 1313966 A | 9/2001 |
| CN | 1438554 A | 8/2003 |
| CN | 1838309 A | 9/2006 |
| CN | 1955867 A | 5/2007 |
| CN | 101382797 A | 3/2009 |
| CN | 101572926 A | 11/2009 |
| CN | 102141776 A | 8/2011 |
| DE | 10304902 A1 | 10/2003 |
| DE | 102004029022 | 2/2005 |
| EP | 0 277 006 A2 | 8/1988 |
| EP | 0 491 657 A1 | 6/1992 |
| EP | 1030231 A1 | 8/2000 |
| GB | 0 321 249 A | 11/1929 |
| GB | 2 283 836 A | 5/1995 |
| GB | 2 431 752 A | 5/2007 |
| GB | 2 440 167 | 1/2008 |
| GB | 2 452 617 A | 3/2009 |
| GB | 2 475 629 A | 5/2011 |

(56) References Cited

FOREIGN PATENT DOCUMENTS

| | | |
|---|---|---|
| JP | 1-165609 A | 6/1989 |
| JP | 5-158502 A | 6/1993 |
| JP | 6-035502 A | 2/1994 |
| JP | 6-332506 A | 12/1994 |
| JP | 7-004769 A | 1/1995 |
| JP | 7-098606 | 4/1995 |
| JP | 7-160307 A | 6/1995 |
| JP | H08-263103 A | 10/1996 |
| JP | 10-224239 A | 8/1998 |
| JP | 11-065609 | 9/2000 |
| JP | 2000-339729 A | 12/2000 |
| JP | 2001-036542 A | 2/2001 |
| JP | 2006-059214 A | 3/2006 |
| JP | 2007-149073 A | 6/2007 |
| JP | 4307608 B2 | 8/2009 |
| JP | 5252564 B2 | 7/2013 |
| JP | 5-346802 B2 | 11/2013 |
| NZ | 216109 A | 8/1989 |
| NZ | 227231 A | 1/1991 |
| NZ | 239534 A | 11/1993 |
| WO | WO-01/35190 | 5/2001 |
| WO | WO-2004109984 A2 | 12/2004 |
| WO | WO-2006/107933 A1 | 10/2006 |
| WO | WO-2006/133096 A2 | 12/2006 |
| WO | WO-2015/143298 A1 | 9/2015 |

OTHER PUBLICATIONS

Rabi et al,, "Event-Triggered Strategies for Industrial Control Over Wireless Networks", WICON 2008, retrieved from http://www.diva-portal.Org/smash/get/diva2:496662/FULLTEXT01 on Apr. 29, 2017.
Search Report for Application No. GB1617274.4, dated Mar. 31, 2017.
Examination Report for Application No. GB1300657.2, dated Feb. 23, 2017.
International Preliminary Report on Patentability for Application No. PCT/US2015/021713, dated Sep. 20, 2016.
Chinese Office Action for Application No. 201310025666.8, dated Jun. 2, 2016.
Office Action for Japanese Application No. 2013-006707, dated Oct. 18, 2016.
"Cellular Digital Packet Data Reduces SCADA Costs", reprinted from The American Oil and Gas Reported, Aug. 1997, 4 pages.
"Competency in Process Control—Industry Guidelines," EnTech Control Engineering Inc., Version 1.0, (1994).
"Configuring CL6010, CL6210, and CL7010 Series Interactive and Computing Controllers, FG4.2:CL6011," Fisher Controls publication, pp. 6-46 (1985).
"FloBoss 500 Flow Manager", Fisher Controls International. Inc., 2 pages, Sep. 1996.
"LONMARK Functional Profile: Pressure Sensor" [online], 1997, LONMARK Interoperability Association. Available from http://web.archive.org/web/20030910010803/http://www.lonmark.org/profiles/1030_10.PDF [Accessed Dec. 13, 2012], in particular see passage in section "Send on delta" on pp. 5 and 6.
"The En Tech Report," http://www.emersonprocess.com/solutions/services/entech/publications/index.asp, pp. 1-4 (Oct. 24, 2005).
"The Fisher R0C306 and R0C312", Fisher Controls International, Inc., 2 pages, Jun. 1997.
"The Fisher R0C364.", Fisher Controls International, Inc., 2 pages, Jul. 1996.
Advant® OCS with Master Software, "Functional Untis Part 2 AI AO DI DO," User's Guide (1997).
Advant® OCS with Master Software, "Functional Untis Part 4 PIDCON RATIOSTN MANSTN," User's Guide (1997).
Advisory Action for U.S. Appl. No. 11/850,810, dated Nov. 28, 2011.
Aspentech, "Analysis of Data Storage Technologies for the Management of Real-Time Process Manufacturing Data," Analysis of Information Management, Retrieved from the Internet Aug. 17, 2007: URL http://www.aspentech.com/publication_files/White_Paper_for_IP_21.pdf.
Astrom et al., "Advanced PID Control," ISA, pp. 85-86 (2006).
Astrom et al., "Event Based Control," Analysis and Design of Nonlinear Control Systems, Springer Verlag, pp. 127-147 (2007).
Blevins et al., "PID Advances in Industrial Control," IFAC Conference on Advances in PID Control PID'12, (2012).
Blevins et al., "PID Control Using Wireless Measurements," IEEE 2014 American Control Conference.
Blevins et al., Control Loop Foundation—Batch and Continuous Processes, ISA, pp. 266, 270, 393.
Caro, "Wireless Networks for Industrial Automation," *ISA* (2004).
Chen et al., "Similarity-Based Traffic Reducting to Increase Battery Life in a Wireless Process Control Network," (2005). Retrieved from the Internet at: URL:http://knowledge.deltav.com/Controlloop2/media/docs/.
Chen, "Real-Time Data Management in the Distributed Environment," Ph.D. Thesis, University of Texas at Austin (1999).
Chinese Office Action for Application No. 200610149998.7, dated Dec. 4, 2009.
Chinese Office Action for Application No. 200610149999.1, dated Dec. 4, 2009.
Chinese Office Action for Application No. 200810135579.7, dated Feb. 13, 2012.
Chinese Office Action for Application No. 200810135579.7, dated Sep. 18, 2013.
Chinese Office Action for Application No. 201010514547.5, dated Sep. 22, 2011.
Chinese Office Action for Application No. 201110021318.4, dated Dec. 8, 2011.
Communication of a Notice of Opposition for European Application No. 08163662.3, dated Dec. 27, 2011.
D.A. Roberts, "OLCHFA" A Distributed Time-Critical Fieldbus, IEE, UK, London, Digest No. 1993/189, Oct. 1993, pp. 6/1-6/3.
Decision of Refusal for Japanese Application No. 2008-223363, dated Dec. 17, 2013.
Eccles, "IEEE-1451.2 Engineering Units Conversion Algorithm," *Sensors* (1999).
EnTech Control Engineering Inc., "Automatic Controller Dynamic Specification," Available at: URL http://www.emersonprocess.com/entechcontrol/download/publications/control.pdf.
European Search Report for Application No. EP08163662.3, dated Jan. 26, 2009.
Examination Report for Application No. GB0620420.0, dated Jun. 22, 2010.
Examination Report for Application No. GB0620421.8, dated Jul. 26, 2010.
Examination Report for Application No. GB0620421.8, dated Mar. 21, 2011.
Examination Report for Application No. GB0816097.0, dated Apr. 24, 2013.
Examination Report for Application No. GB0816097.0, dated Feb. 14, 2012.
Examination Report for Great Britain Patent Application No. GB0816097.0, dated Dec. 18, 2012.
Fourth Office Action, Chinese Patent Application No. 200810135579.7, dated Feb. 21, 2014.
Freescale Semiconductor," Welcome to Freescale Semiconductor," Retrieved from the Internet on Aug. 17, 2007: URL http://www.freescale.com/.
Han et al., "Control Over WirelessHART Network," 36th Annual Conference of the IEEE Industrial Electronics Society (2010).
HART Communication Foundation: Common Practice Command Specification, HCF_SPEC-151, Revision 9.0 (2007).
HART Field Communications Protocol, Application Guide, HCF LIT 34 (1999).
Hieb, "Developing a Small Wireless Control Network," Master's Thesis, University of Texas at Austin (2003).
IEC, "Telecontrol Equipment and Systems—Part 5-101: Transmission Protocols—Companion Standard for Basic Telecontrol Tasks," IEC 60870-5-101 (2003).

(56) References Cited

OTHER PUBLICATIONS

IEEE, "IEEE Wireless Standards Zone," Retrieved from Internet on Aug. 17, 2007: URL http://standards.ieee.org/wireless/.
International Search Report and Written Opinion for Application No. PCT/US2015/021713, dated Aug. 12, 2015.
Japanese Office Action for Application No. 2006-289675, dated Nov. 22, 2011.
Japanese Office Action for Application No. 2006-289928, dated Nov. 22, 2011.
Japanese Office Action for Application No. 2009-244331, dated Nov. 22, 2011.
Japanese Office action for Patent Application No. Hei 8-513089 dated Sep. 29, 2005.
Johnson, "Vital Link to Process Control," *Control Engineering*, 52(10) (2005).
Lee, "Smart Transducers (Sensors or Actuators), Interfaces, and Networks," Electronic Instrument Handbook, Chapter 47 (2004).
Lian et al., "Network design consideration for distributed control systems" IEEE Transactions on Control Systems Technology, 10(2):297-307 (2002).
Liptak, Bela G., "Sample -and hold Algorithms," *Instrument Engineers Handbook*, Third Edition, Process Control, p. 29 (1995).
LonMark® Functional Profile: Pressure Sensor, Version 1.0, Pressure Sensor: 1030 (1997).
LonMark® Functional Profile: Pump Controller, Version 1.0, Pump Controller: 8120 (2003).
Miskowicz, "Send-On-Delta Concept: An Event-Based Data Reporting Strategy," *Sensors*, 6:49-63 (2006).
Montestruque et al., "On the Model-Based Control of Networked Systems," *Automatica*, 39:1837-1843 (2003).
Montestruque et al., "Stability of Model-Based Networked Control Systems with Time-Varying Transmission Times," *IEEE Transactions on Automatic Control*, 49.9:1562-1572 (2004).
Nixon et al., "Meeting Control Performance Over a Wireless Mesh Network," Automation Science and Engineering, pp. 540-547 (2008).
Notice of Reasons for Rejection for Japanese Patent Application No. 2006-289675, dated Jul. 31, 2012.
Notice of Reasons for Rejection for Japanese Patent Application No. 2006-289928, dated Jul. 31, 2012.
Notice of Reasons for Rejection for Japanese Patent Application No. 2008-223363, dated Dec. 4, 2012.
Notice of Reasons for Rejection for Japanese Patent Application No. 2009-244331, dated Jul. 31, 2012.
Office Action for U.S. Appl. No. 11/258,676, dated May 12, 2008.
Office Action for U.S. Appl. No. 11/258,676, dated Sep. 17, 2008.
Office Action for U.S. Appl. No. 11/499,013, dated Sep. 18, 2008.
Office Action for U.S. Appl. No. 11/850,810, dated Dec. 10, 2010.
Office Action for U.S. Appl. No. 11/850,810, dated Jun. 28, 2011.
Office Action for U.S. Appl. No. 11/850,810, dated Jun. 7, 2010.
Office Action for U.S. Appl. No. 11/850,810, dated Nov. 9, 2009.
Office Action for U.S. Appl. No. 12/537,778, dated Apr. 5, 2010.
Office Action for U.S. Appl. No. 12/537,778, dated Oct. 21, 2010.
Office Action of the German Patent and Trademark office, German Patent Application No. 10 2006 049 832.1, received Feb. 9, 2015.
Olfati-Saber et al., "Consensus Problems in Networks of Agents with Switching Topology and Time-Delays" IEEE Transactions on Automatic Control, 49(9):1520-1533 (2004).
Rabi et al., "Event-Triggered Strategies for Industrial Control Over Wireless Networks," In Proceedings of 4th Annual International Conference on Wireless Internet (2008).
Search Report for Application No. GB0611940.8, dated Sep. 21, 2006.
Search Report for Application No. GB0620420.0, dated Feb. 12, 2007.
Search Report for Application No. GB0620421.8, dated Feb. 2, 2007.
Search Report for Application No. GB0816097.0, dated Oct. 24, 2008.
Search Report for Application No. GB1300657.2, dated Jun. 13, 2013.
Second Office Action for Chinese Patent Application No. 200610149999.1, dated Sep. 1, 2010.
Second Office Action for Chinese Patent Application No. 200810135579.7, dated Jan. 7, 2013.
Shinskey, F. Greg, "The Power of External-Reset Feedback," *Control*, pp. 53-63 (May 2006).
Shinskey, F.G., "Sampled Integral Controller," *Feedback Controllers for the Process Industry*, p. 93 (1994).
Shinskey, F.G., "Sampling Controllers," *Process Control Systems*, Third Edition, pp. 161-162 ((1988).
Siebert et al., "WirelessHART Successfully Handles Control," Chemical Process, Jan. 2011.
Tatikondaet al., "Control Under Communication Constraints", IEEE Transactions on Automatic Control, 49(7):1056-1068 (2004).
Vasyutynaskyy et al., "Towards Comparison of Deadband Sampling Types," Proceedings of the IEEE International Symposium on Industrial Electronics, pp. 2899-2904 (2007).
Wei, Yang, "Implementation of IEC61499 Distributed Function Block Architecture for Industrial Measurement and Control Systems (IPMCS)," National University of Singapore, Department of Electrical & Computer Engineering, (2001/2002).
Wong et al., "Systems with Finite Communication Bandwidth Contraints—Part I & II," IEEE Transactions on Automatic Control (1997).
Li et al., "Genetic Programming and Creative Design of Mechatronic Systems," (2009).
Search Report for Chinese Application No. 201580015134.3, dated Nov. 26, 2018.
First Office Action for Chinese Application No. 20180015134.3, dated May 15, 2019.
Notice of Reasons for Rejection for Japanese Application No. 2016-557951, dated Jun. 4, 2019.

\* cited by examiner

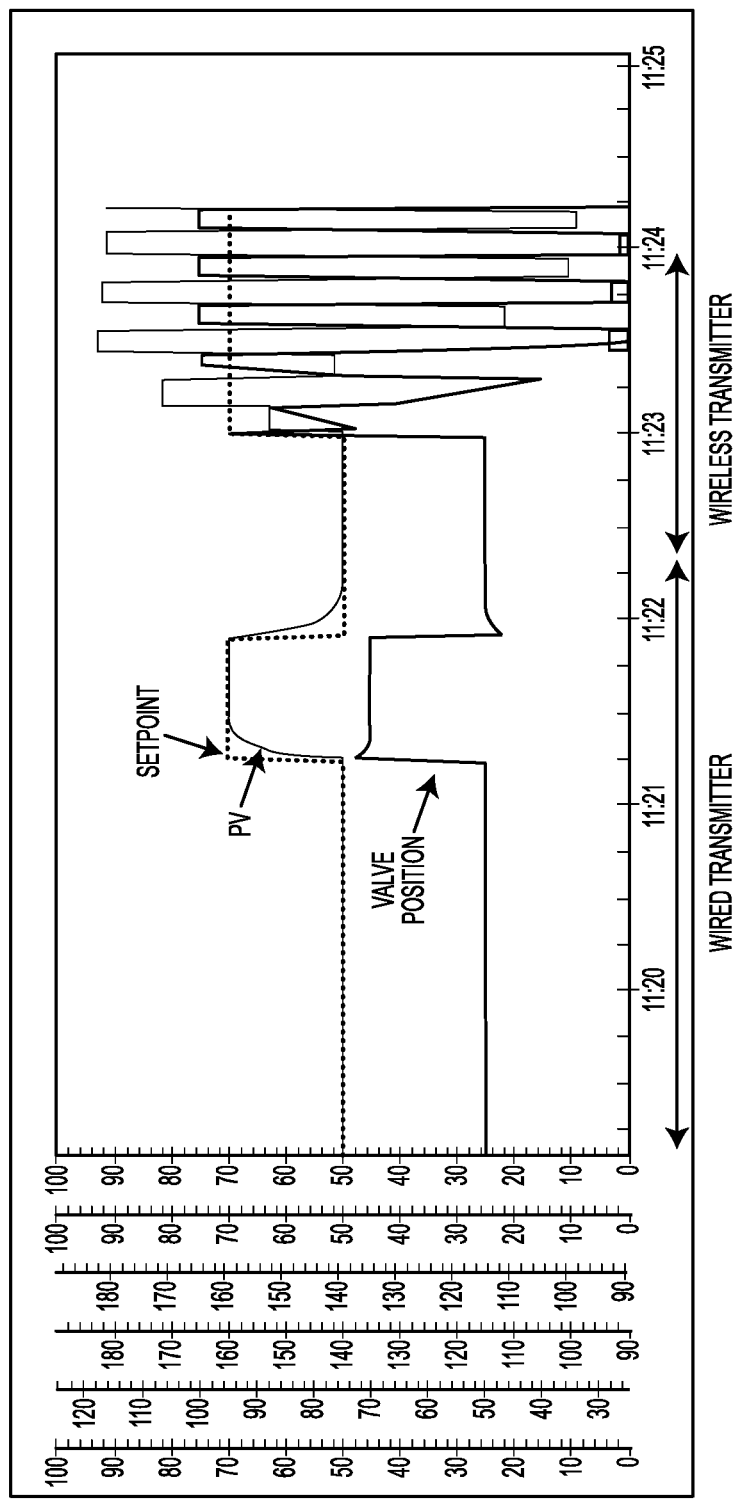

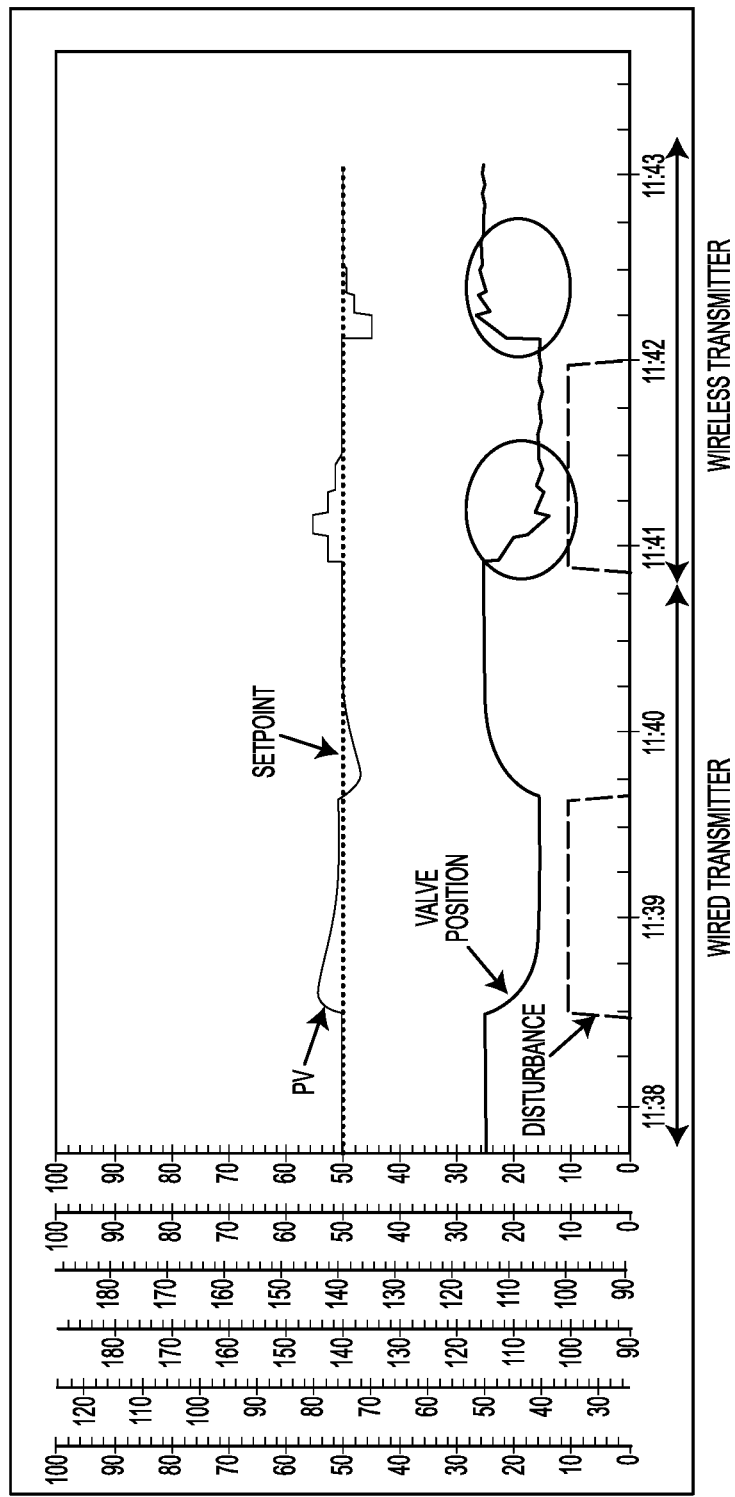

VELOCITY BASED CONTROL IN A NON-PERIODICALLY UPDATED CONTROLLER

CROSS REFERENCE TO RELATED APPLICATIONS

This application claims priority to U.S. Provisional Patent Application Ser. No. 62/240,322, entitled "Velocity Based Control in a Non-Periodically Updated Controller," which was filed on Oct. 12, 2015, and claims priority, as a continuation-in-part application, to U.S. patent application Ser. No. 13/351,802, entitled "Compensating for Setpoint Changes in a Non-Periodically Updated Controller," which was filed on Jan. 17, 2012, the entire disclosures of each of which is hereby expressly incorporated by reference herein.

TECHNICAL FIELD

This patent relates to compensating a method and system for providing velocity based control in a process control system that uses non-periodic control or slow feedback process variable communications and, more particularly, to a device and method configured to robustly control a process when implementing control when receiving process variable feedback at a rate that is slow compared to the process dynamics.

DESCRIPTION OF THE RELATED ART

Process control systems, such as distributed or scalable process control systems like those used in chemical, petroleum or other processes, typically include one or more process controllers communicatively coupled to each other, to at least one host or operator workstation and to one or more field devices via analog, digital or combined analog/digital buses. The field devices, which may be, for example, valves, valve positioners, switches and transmitters (e.g., temperature, pressure and flow rate sensors), perform functions within the process such as opening or closing valves and measuring process parameters. The process controller receives signals indicative of process measurements made by the field devices and/or other information pertaining to the field devices, and uses this information to implement a control routine to generate control signals which are sent over the buses to the field devices to control the operation of the process. Information from the field devices and the controller is typically made available to one or more applications executed by the operator workstation to enable an operator to perform any desired function with respect to the process, such as viewing the current state of the process, modifying the operation of the process, etc.

Some process control systems, such as the DeltaV® system sold by Emerson Process Management, use function blocks or groups of function blocks referred to as modules located in the controller or in different field devices to perform control and/or monitoring operations. In these cases, the controller or other device is capable of including and executing one or more function blocks or modules, each of which receives inputs from and/or provides outputs to other function blocks (either within the same device or within different devices), and performs some process operation, such as measuring or detecting a process parameter, monitoring a device, controlling a device, or performing a control operation, such as the implementation of a proportional-derivative-integral (PID) control routine. The different function blocks and modules within a process control system are generally configured to communicate with each other (e.g., over a bus) to form one or more process control loops.

Process controllers are typically programmed to execute a different algorithm, sub-routine or control loop (which are all control routines) for each of a number of different loops defined for, or contained within a process, such as flow control loops, temperature control loops, pressure control loops, etc. Generally speaking, each such control loop includes one or more input blocks, such as an analog input (AI) function block, a single-output control block, such as a proportional-integral-derivative (PID) or a fuzzy logic control function block, and an output block, such as an analog output (AO) function block. Control routines, and the function blocks that implement such routines, have been configured in accordance with a number of control techniques, including PID control, fuzzy logic control, and model-based techniques such as a Smith Predictor or Model Predictive Control (MPC).

To support the execution of the routines, a typical industrial or process plant has a centralized control room communicatively connected with one or more process controllers and process I/O subsystems, which, in turn, are connected to one or more field devices. Traditionally, analog field devices have been connected to the controller by two-wire or four-wire current loops for both signal transmission and the supply of power. An analog field device that transmits a signal to the control room (e.g., a sensor or transmitter) modulates the current running through the current loop, such that the current is proportional to the sensed process variable. On the other hand, analog field devices that perform an action under control of the control room is controlled by the magnitude of the current through the loop.

With the increased amount of data transfer, one particularly important aspect of process control system design involves the manner in which field devices are communicatively coupled to each other, to controllers and to other systems or devices within a process control system or a process plant. In general, the various communication channels, links and paths that enable the field devices to function within the process control system are commonly collectively referred to as an input/output (I/O) communication network.

The communication network topology and physical connections or paths used to implement an I/O communication network can have a substantial impact on the robustness or integrity of field device communications, particularly when the network is subjected to adverse environmental factors or harsh conditions. These factors and conditions can compromise the integrity of communications between one or more field devices, controllers, etc. The communications between the controllers and the field devices are especially sensitive to any such disruptions, inasmuch as the monitoring applications or control routines typically require periodic updates of the process variables for each iteration of the routine. Compromised control communications could therefore result in reduced process control system efficiency and/or profitability, and excessive wear or damage to equipment, as well as any number of potentially harmful failures.

In the interest of assuring robust communications, I/O communication networks used in process control systems have historically been hardwired. Unfortunately, hardwired networks introduce a number of complexities, challenges and limitations. For example, the quality of hardwired networks may degrade over time. Moreover, hardwired I/O communication networks are typically expensive to install, particularly in cases where the I/O communication network is associated with a large industrial plant or facility distributed over a large area, for example, an oil refinery or chemical plant consuming several acres of land. The requisite long wiring runs typically involve substantial amounts of labor, material and expense, and may introduce signal degradation arising from wiring impedances and electromagnetic interference. For these and other reasons, hardwired I/O communication networks are generally difficult to reconfigure, modify or update.

It has been suggested to use wireless I/O communication networks to alleviate some of the difficulties associated with hardwired I/O networks. For example, U.S. Patent Application Publication No. 2003/0043052, entitled "Apparatus for Providing Redundant Wireless Access to Field Devices in a Distributed Control System," the entire disclosure of which is hereby expressly incorporated by reference herein, discloses a system utilizing wireless communications to augment or supplement the use of hardwired communications.

Reliance on wireless communications for control-related transmissions has traditionally been limited due to, among other things, reliability concerns. As described above, modern monitoring applications and process control relies on reliable data communication between the controller and the field devices to achieve optimum control levels. Moreover, typical controllers execute control algorithms at fast rates to quickly correct unwanted deviations in the process. Undesirable environmental factors or other adverse conditions may create intermittent interferences that impede or prevent the fast communications necessary to support such execution of monitoring and control algorithms. Fortunately, wireless networks have become much more robust over the last two decades, enabling the reliable use of wireless communications in some types of process control systems.

However, power consumption is still a complicating factor when using wireless communications in process control applications. Because wireless field devices are physically disconnected from the I/O network, the field devices typically need to provide their own power source. Accordingly, field devices may be battery powered, draw solar power, or pilfer ambient energy such as vibration, heat, pressure, etc. For these devices, energy consumed for data transmission may constitute a significant portion of total energy consumption. In fact, more power may be consumed during the process of establishing and maintaining a wireless communication connection than during other important operations performed by the field device, such as the steps taken to sense or detect the process variable being measured. To reduce power consumption in wireless process control systems and thus prolong battery life, it has been suggested to implement a wireless process control system in which the field devices, such as sensors, communicate with the controller in a non-periodic, slow or intermittent manner. In one case, the field devices may communicate with or send process variable measurements to the controller only when a significant change in a process variable has been detected, leading to non-periodic communications with the controller.

One control technique that has been developed to handle non-periodic process variable measurement updates uses a control system that provides and maintains an indication of an expected process response to the control signal produced by the controller between the infrequent or non-periodic measurement updates. An expected process response may be developed by a mathematical model that calculates an expected process response to a control signal for a given measurement update. One example of this technique is described in U.S. Pat. No. 7,587,252, entitled, "Non-Periodic Control Communications in Wireless and Other Process Control Systems," the entire disclosure of which is hereby expressly incorporated by reference herein. In particular, this patent discloses a control system having a filter that generates an indication of an expected process response to a control signal upon the receipt of a non-periodic process variable measurement update and that maintains the generated indication of the expected process response until the arrival of the next non-periodic process variable measurement update. As another example, U.S. Pat. No. 7,620,460, entitled "Process Control With Unreliable Communications," the entire disclosure of which is hereby expressly incorporated by reference herein, discloses a system that includes a filter that provides an indication of an expected response to the control signal but further modifies the filter to incorporate a measurement of the time that has elapsed since a last non-periodic measurement update to generate a more accurate indication of the expected process response.

However, in many control applications, a process control system may receive a setpoint change during process operation. Generally, when a setpoint is changed during the execution of a periodically updated control system (e.g. a hard-wired control communication system), a controller that is designed to take proportional action on the error between the setpoint and the measured process variable will immediately change the controller output to drive the process variable towards the new steady state value. However, in a wireless control system that receives infrequent, non-periodic measurement updates that operates as described in both of the examples above, the measured process response reflected by each new measurement update reflects changes made in the controller output taken on account of the last measurement update in addition to changes in the output resulting from the setpoint change made sometime after the last measurement update was received. In this case, the calculation of the controller reset component based on the controller output and the time since the last measurement update (as described in U.S. Pat. No. 7,620,460) may over compensate for changes made after the last measurement update. The process response to a setpoint change may therefore differ based on when the setpoint change was made after the last measurement update. As a result, this system does not respond as quickly or as robustly to a setpoint change because the controller continues to rely on a previously generated (and now outdated) indication of the expected response when developing the control signal after a change in the setpoint. To overcome this problem, U.S. Patent Application Publication No. 2013/0184837, entitled "Compensating for Setpoint Changes in a Non-Periodically Updated Controller," the entire disclosure of which is hereby expressly incorporated by reference herein, discloses a system that uses a continuously updated filter in a feedback loop within the controller to track the operation of the controlled variable during the times at which no new process variable measurement is received and uses the output of this controller when a new process variable measurement is received at the controller, but otherwise uses the output of the filter from the most recent time that a measurement of the process variable has been received to generate a control signal. In this system, the control signal generated is more responsive to and operates better when there are changes in the setpoint of the process variable between times at which process variable measurements are received.

Moreover, when using battery powered transmitters in wireless control systems, it is desirable to set up the system to maintain a long battery life. For example, to obtain a battery life of 3-5 years using current transmitter and battery technology, it is generally necessary to use a communication update rate of 8 seconds or greater. Using such a slow update rate, however, restricts using PID (proportional-integral-derivative) based wireless control to processes that have a process response time of 30 seconds or more because it is important to still have process feedback measurements received at a rate that is at least four times the rate associated with the response time of the process (i.e., the inverse of the process response time) to maintain control of the process.

Still further, various types of PID algorithms exist that may be used to address wireless control, including those using producing a positional output, e.g., a 4-20 ma signal or digital signal that is provided to the valve or other controlled element telling the element the ultimate position to which to move. However, other PID algorithms exist that that provide velocity based control signals which instruct the valve or other controlled element to move a certain amount in a certain direction, for example, by energizing the moveable element for a certain amount of time. Such velocity based control signals are commonly used with electric motors and provide control signal in the form of pulsed signal (having a pulse width that is modulated to indicates the amount of time the valve should energize the movable element to move over a particular period of time). Velocity based controllers tend to produce a change in position signal, as opposed to a signal indicating an actual position to be obtained by the moveable element. Thus, velocity based control algorithms tend to be used to provide an incremental (increase/decrease) output to an actuator and so may be used in controlling actuators that may not provide position feedback.

SUMMARY

A control technique allows for the robust control of a process or control loop having fast dynamics with respect to the rate at which measured values of a controlled process variable are provided as feedback to the process controller. In particular, the control technique uses a positional or a velocity form of a PID algorithm to be able to control processes in which a process variable measurements or feedback signals are provided to the controller at a time interval that is equal to or even greater than the process response time. In particular, the control technique may be used to provide robust control in processes having a response time that is two to four times less than the feedback time interval. Such situations can arise, for example, when using wireless control in which the process variable feedback measurements are provided to the controller wirelessly, intermittently, or at a time interval that is less than, close to or even greater than the response time of the process.

The disclosed velocity PID control routine may be used in many different situations, such as to perform control using a wireless measurement when the actuator requires an incremental input and no position feedback is available to the controller, to perform control with wired measurements when interfacing to an actuator that requires a positional or incremental input, and to address traditional installations as well as newer installations where wireless measurements are used in control. Moreover, tuning of the velocity form of the PID algorithm may be performed based on the process gain and dynamics and is independent of the wireless communication rate. Still further, the velocity form of the PID control routine automatically holds the last output position on loss of communications and provides bumpless recovery when communications are re-established.

In one case, the controller that implements the new control technique generally includes differential construction in that differential proportional, integral, and derivative control signal components are generated and used to create a differential or movement based control signal which is then sent to the controlled device, e.g., a valve, to control the operation of the controlled device and thus the process. This differential or velocity based form of control generates a control signal that operates better than standard PID control in the presence of slow process variable feedback measurements. In particular, the controller using this control technique generates, during each controller iteration, a differential proportional value representing the difference between a previous proportional control signal component and a newly calculated proportional control signal component and this differential proportional value is used as the basis for each new control signal from the controller. However, various other control signal components, e.g., a derivative and/or an integral control signal component, may be added to or combined with the differential proportion control signal component when a new process variable measurement signal is available at the controller. These two control signal components may also be based on differentials between newly calculated values and previously calculated values. In particular, a new derivative component may be calculated during the controller iterations at which a newly received value of a process variable measurement is available at the controller. Likewise, a new integral component may be developed using a continuously updated filter that generates a new indication of an expected response of the process for each control routine iteration of the controller. However, the output of the continuously updated filter is used to generate a new integral component only when a new value of a process variable measurement is received. At other times, the integral control signal component is set to zero.

The velocity based PID control technique disclosed herein uses the differential signal form to produce a control signal that adapts quickly to changes in the setpoint (even between times at which a process variable feedback signal is present at the input of the controller) while still providing robust and stable control in the presence of slowly received (e.g., intermittent) feedback signals, including feedback signals received at a rate that is less than (e.g., even two to four times less than), close to or greater than the inverse of the response time of the process being controlled.

BRIEF DESCRIPTION OF THE DRAWINGS

FIG. 12A is a graph illustrating the simulated process response of an example prior art velocity based PID controller in both a wired and a wireless configuration in response to a setpoint change in the primary control variable and with a process response time of 3 seconds.

FIG. 13A is a graph illustrating the simulated process response of an example prior art velocity based PID controller in both a wired and a wireless configuration in response to a disturbance change and with a process response time of 8 seconds.

DETAILED DESCRIPTION

Figure 1:
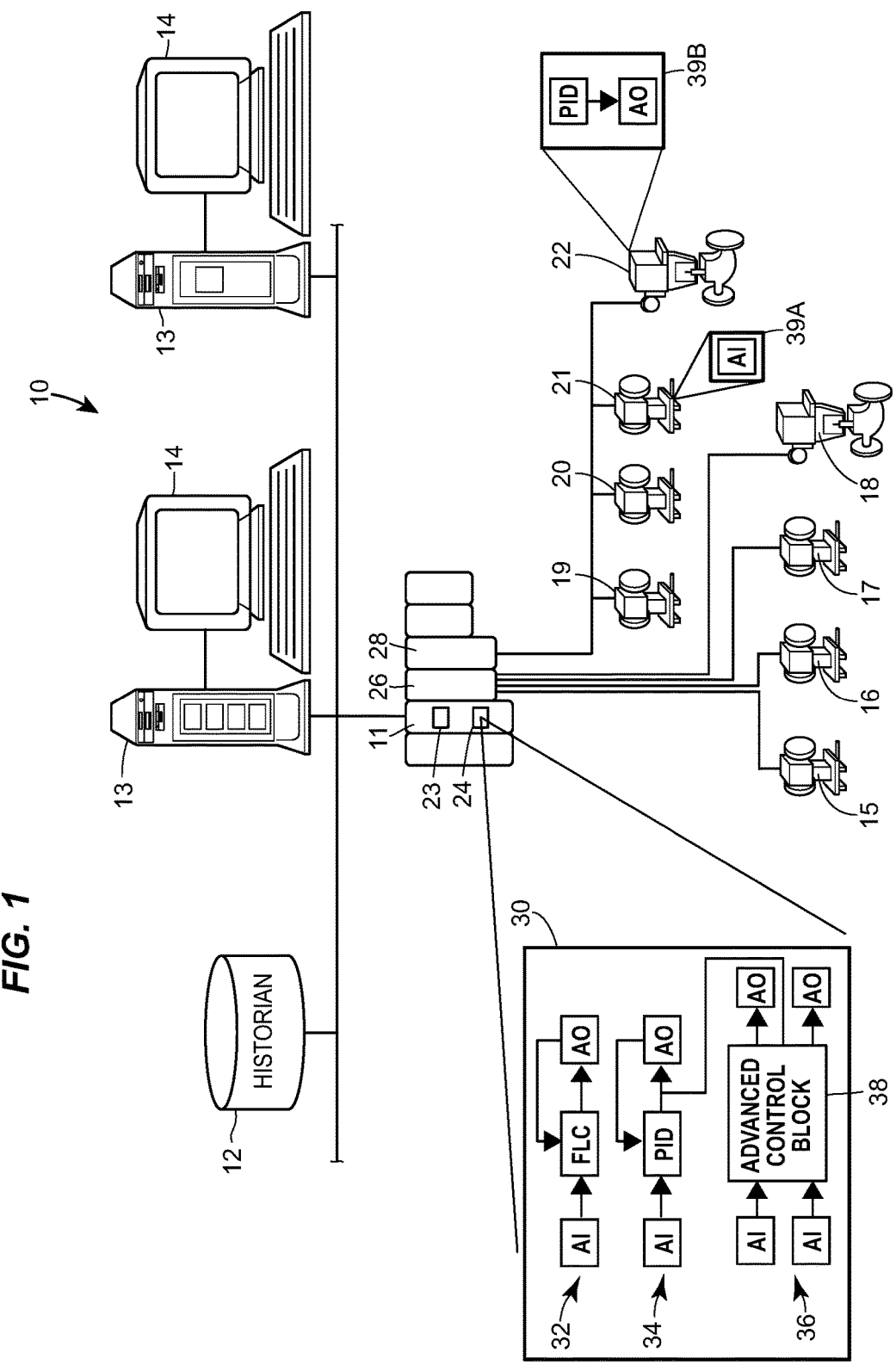
FIG. 1 is a block diagram of an example, periodically updated, hard-wired process control system.

A control technique is usable to perform control in a process loop in which process measurement feedback signals are slow or intermittently received and is particularly useful when the process measurement feedback signals are received at a rate that slower than, is similar to, or only slightly greater than the rate associated with the process dynamics being controlled, such as the inverse of the process response time. This controller may be used, for example, in controllers that receive process measurement signals as feedback signals in a slow and/or non-periodic manner and in particular at a rate that is less than, on the same order of magnitude or otherwise similar to the process response rate of the process dynamics being controlled (i.e., the inverse of the process response time for the process variable being controlled). In one case, the control technique produces a control signal for use in controlling a process device, such as a valve, by combining a proportional contribution signal with one or more of a derivative contribution signal and an integral contribution signal. In one case, in which a velocity based PID algorithm is used, the controller produces a proportional contribution value from a difference between a setpoint and a most recently received process variable measurement feedback signal. This error signal is than multiplied by a gain signal and provided to a difference unit that determines the change in this signal since the last execution cycle of the controller. Moreover, a derivative unit may receive the error signal and performs a derivative calculation on the error signal essentially taking a derivative of the error signal over time since the last measurement signal has been received at the controller. The output of the derivative module or calculation is also provided to a change detection unit or a difference unit that determines the difference between the current output of the derivative calculation and the previous value used in the calculation of a control signal. Likewise, an integral calculation unit receives and integrates (e.g. sums) the difference of the control signal as produce by the proportional and derivative units. The output of the summer is provided to a filter that operates to filter the summer output to produce an integral contribution signal. However this integral contribution is provided to a summer that sums this contribution with the output of the control signal only when a new feedback values is provided to the controller. That is, the integral contribution is set to zero for all controller iterations except those at which a new feedback signal is available to the controller.

Generally speaking, the continuously updated filter of the integral contribution unit within the controller generates an indication of an expected process response (also called a feedback contribution) during each control routine iteration of the controller, despite receiving process variable measurement value updates slowly or non-periodically from field devices. The continuously updated filter uses, in part, a previously generated indication of an expected response from the last control routine iteration and the control routine execution period to generate the indication of an expected response during each control routine iteration. In addition, an integral output switch within the controller provides an output of the continuously updated filter as a feedback contribution, such as an integral (also known as reset) contribution, based on the newest measurement indication, to the control signal. Generally speaking, the integral output switch provides an expected process response as generated by the continuously updated filter at the time that the last measurement value update was received by the controller or a zero value in a velocity form of the PID controller as the integral or reset contribution to the control signal during each iteration of the controller at which a new measurement signal is not available. When a new measurement value update is available, the integral output switch clamps onto a new indication of the expected process response generated by the continuously updated filter (based on an indication of the new measurement value update), and provides the new expected process response as the integral contribution of the control signal. As a result, the controller using the continuously updated filter determines a new expected response of the process during each controller iteration, wherein each new expected process response reflects the impact of a setpoint change or a feed-forward change that was made in the time between measurement updates and that affects the controller output during development of the control signal, even though the integral or reset component of control signal is changed only when a new measurement value is available at the controller.

A process control system 10 is illustrated in FIG. 1 that may be used to implement the control methodologies described. The process control system 10 includes a process controller 11 connected to a data historian 12 and to one or more host workstations or computers 13 (which may be any type of personal computers, workstations, etc.), each having a display screen 14. The controller 11 is also connected to field devices 15-22 via input/output (I/O) cards 26 and 28. The data historian 12 may be any desired type of data collection unit having any desired type of memory and any desired or known software, hardware or firmware for storing data. The controller 11 is, in FIG. 1, communicatively connected to the field devices 15-22 using a hardwired communication network and communication scheme.

Generally, the field devices 15-22 may be any types of devices, such as sensors, valves, transmitters, positioners, etc., while the I/O cards 26 and 28 may be any types of I/O devices conforming to any desired communication or controller protocol. The controller 11 includes a processor 23 that implements or oversees one or more process control routines (or any module, block, or sub-routine thereof) stored in a memory 24. Generally speaking, the controller 11 communicates with the devices 15-22, the host computers 13 and the data historian 12 to control a process in any desired manner. Moreover, the controller 11 implements a control strategy or scheme using what are commonly referred to as function blocks, wherein each function block is an object or other part (e.g., a subroutine) of an overall control routine that operates in conjunction with other function blocks (via communications called links) to implement process control loops within the process control system 10. Function blocks typically perform one of an input function, such as that associated with a transmitter, a sensor or other process parameter measurement device, a control function, such as that associated with a control routine that performs PID, fuzzy logic, etc. control, or an output function which controls the operation of some device, such as a valve, to perform some physical function within the process control system 10. Of course, hybrid and other types of function blocks exist and may be utilized herein. The function blocks may be stored in and executed by the controller 11 or other devices as described below.

As illustrated by the exploded block 30 of FIG. 1, the controller 11 may include a number of single-loop control routines, illustrated as control routines 32 and 34, and, if desired, may implement one or more advanced control loops, illustrated as a control loop 36. Each such control loop is typically referred to as a control module. The single-loop control routines 32 and 34 are illustrated as performing single loop control using a single-input/single-output fuzzy logic control block and a single-input/single-output PID control block, respectively, connected to appropriate analog input (AI) and analog output (AO) function blocks, which may be associated with process control devices such as valves, with measurement devices such as temperature and pressure transmitters, or with any other device within the process control system 10. The advanced control loop 36 is illustrated as including an advanced control block 38 having inputs communicatively connected to one or more AI function blocks and outputs communicatively connected to one or more AO function blocks, although the inputs and outputs of the advanced control block 38 may be connected to any other desired function blocks or control elements to receive other types of inputs and to provide other types of control outputs. The advanced control block 38 may implement any type of multiple-input, multiple-output control scheme, and may constitute or include a model predictive control (MPC) block, a neural network modeling or control block, a multi-variable fuzzy logic control block, a real-time-optimizer block, etc. It will be understood that the function blocks illustrated in FIG. 1, including the advanced control block 38, can be executed by the stand-alone controller 11 or, alternatively, can be located in and executed by any other processing device or control element of the process control system, such as one of the workstations 13 or one of the field devices 19-22. As an example, the field devices 21 and 22, which may be a transmitter and a valve, respectively, may execute control elements for implementing a control routine and, as such, include processing and other components for executing parts of the control routine, such as one or more function blocks. More specifically, the field device 21 may have a memory 39A for storing logic and data associated with an analog input block, while the field device 22 may include an actuator having a memory 39B for storing logic and data associated with a PID or other control block in communication with an analog output (AO) block, as illustrated in FIG. 1.

Figure 2:
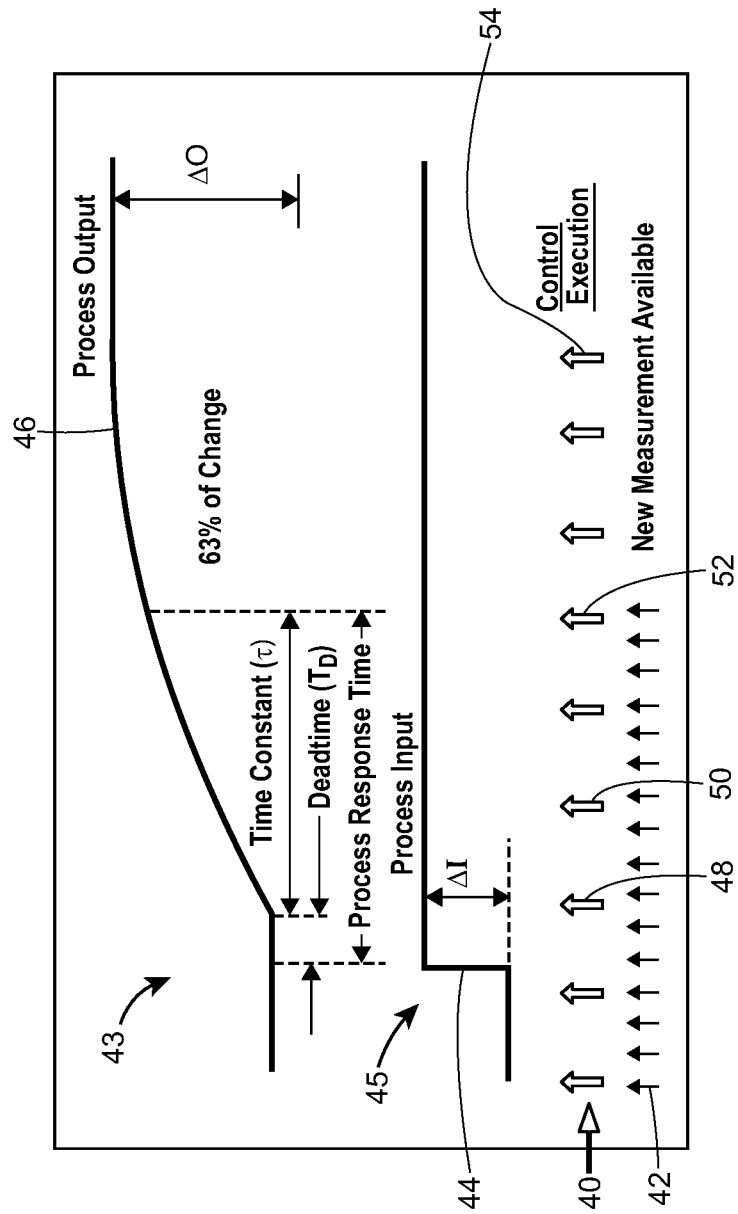
FIG. 2 is graph illustrating a process output response to a process input for an example periodically updated, hard-wired process control system including the process response time.

The graph of FIG. 2 generally illustrates a process output developed in response to a process input for a process control system based on the implementation of one or more of the control loops 32, 34 and 36 (and/or any control loop incorporating the function blocks residing in the field devices 21 and 22 or other devices). The control routine being implemented generally executes in a periodic manner over a number of controller iterations with the times of the control routine execution being indicated in FIG. 2 along the time axis by the thick arrows 40. In a conventional case, each control routine iteration 40 is supported by an updated process measurement indicated by the thin arrows 42 provided by, for instance, a transmitter or other field device. As illustrated in FIG. 2, there are typically multiple periodic process measurements 42 made and received by the control routine between each of the periodic control routine execution times 40. To avoid the restrictions associated with synchronizing the measurement value with control execution, many known process control systems (or control loops) are designed to over-sample the process variable measurement by a factor of 2-10 times. Such over-sampling helps to ensure that the process variable measurement is current for use in the control scheme during each control routine execution or iteration. Also, to minimize control variation, conventional designs specify that feedback based control should be executed 4-10 times faster than the process response time and that a new process variable measurement be available at each controller iteration. The process response time is depicted in a process output response curve 43 of the graph of FIG. 2 as being the time associated with a process time constant (τ) (e.g., 63% of the process variable change) plus a process delay or deadtime ($T_D$) after an implementation of a step change 44 in a process input (shown in the lower line 45 of FIG. 2). In any event, to satisfy these conventional design requirements, the process measurement value updates (indicated by the arrows 42 of FIG. 2) have been sampled and provided to the controller at a much faster rate than the control routine execution rate (indicated by the arrows 40 of FIG. 2), which in turn is much faster or higher than the process response time.

Figure 3:
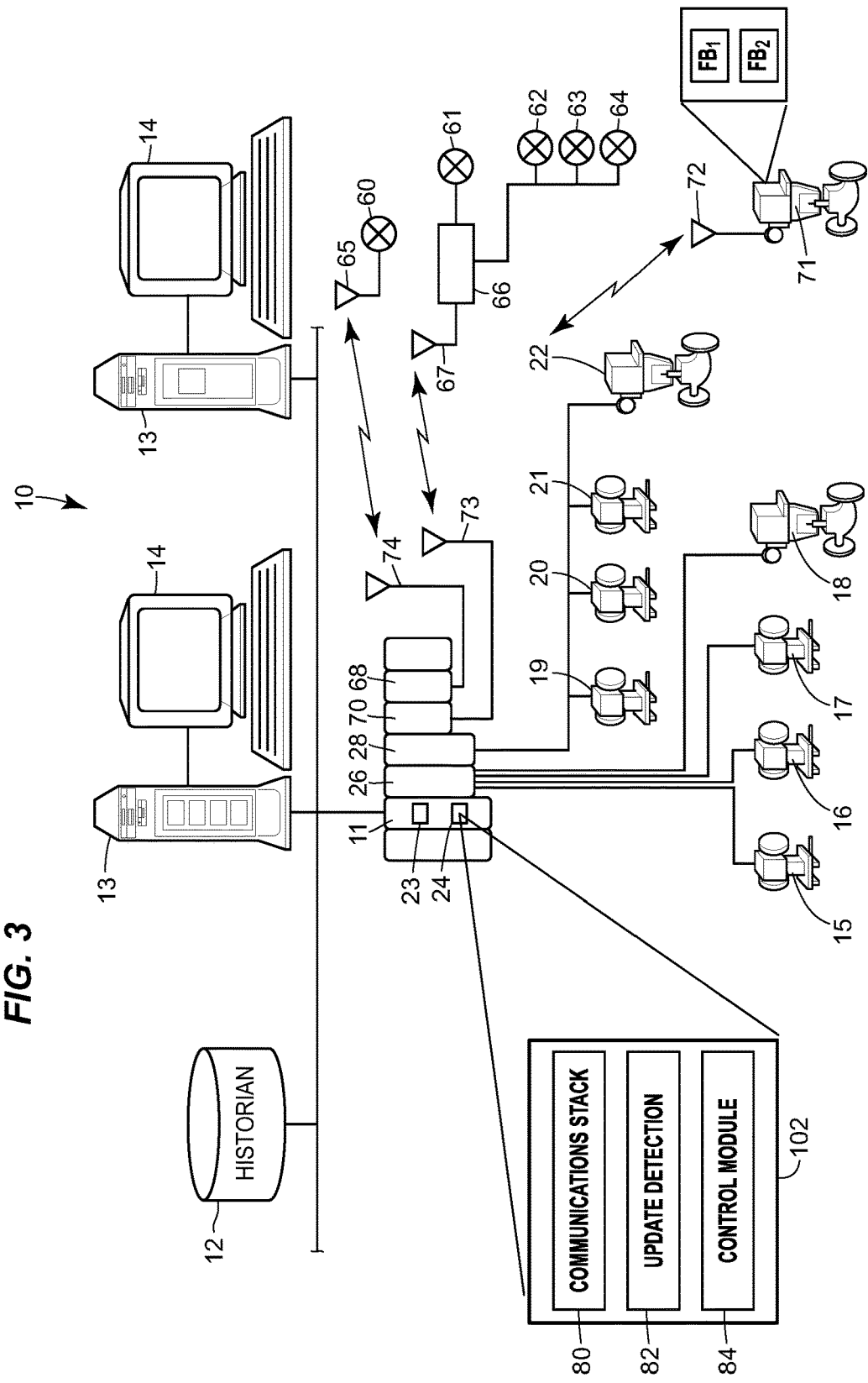
FIG. 3 is a block diagram illustrating an example of a wireless process control system having a controller that receives slow or non-periodic feedback input.

However, obtaining frequent and periodic measurement samples from the process may not be practical or even possible when a controller is operating in process control environment in which, for example, the controller receives measurements wirelessly from one or more field devices. In particular, in these cases, the controller may only be able to receive slow process variable measurements (to conserve battery life of the wireless sensors/transmitters) or non-periodic process variable measurements. Moreover, in these cases, the time between the non-periodic or even periodic process variable measurements may be greater than the control routine execution rate (indicated by the arrows 40 of FIG. 2). FIG. 3 depicts an exemplary wireless process control system 10 that may implement the use of slow and/or non-periodic wireless communications of process control data or process variable measurements at a controller 11.

The control system 10 of FIG. 3 is similar in nature to the control system 10 of FIG. 1, with like elements being numbered the same. However, the control system 10 of FIG. 3 includes a number of field devices 60-64 and 71 which are wirelessly communicatively coupled to the controller 11 and potentially to one another. As illustrated in FIG. 3, the wirelessly connected field device 60 is connected to an antenna 65 and cooperates to communicate wirelessly with an antenna 74 which is, in turn, coupled to a wireless I/O device 68. Moreover, the field devices 61-64 are connected to a wired-to-wireless conversion unit 66 which is, in turn, connected to an antenna 67. The field devices 61-64 communicate wirelessly through the antenna 67 with an antenna 73 connected to a further wireless I/O device 70. As also illustrated in FIG. 3, the field device 71 includes an antenna 72 which communicates with one or both of the antennas 73 and 74 to thereby communicate with the I/O devices 68 and/or 70. The I/O devices 68 and 70 are, in turn, communicatively connected to the controller 11 via a wired backplane connection (not shown in FIG. 3). In this case, the field devices 15-22 remain hardwired to the controller 11 via the I/O devices 26 and 28.

The process control system 10 of FIG. 3 generally uses the wireless transmission of data measured, sensed by or computed by the transmitters 60-64 or other control elements, such as the field device 71, as described below. In the control system 10 of FIG. 3, it will be assumed that new process variable measurements or other signal values are transmitted to the controller 11 by the devices 60-64 and 71 on a slow or non-periodic basis, such as when certain conditions are satisfied. For example, a new process variable measurement value may be sent to the controller 11 when the process variable value changes by a predetermined amount with respect to the last process variable measurement value sent by the device to the controller 11. These signals may also be sent periodically, but at a much slower rate than is normal for typical process control systems, such as wired process control signals. For example, the slow periodic feedback rate may be less than the controller execution rate (the rate at which the controller generates new control signals for use in creating a control signal) and may, using the control techniques described herein, be at a rate that is less than, on par with, or similar to the process response rate or response time, such as a rate that is less than 2-4 times the response rate of the process dynamic being controlled. Here, the process response rate is the inverse of the process response time. Of course, other manners of determining when to send process variable measurement values in a periodic or non-periodic manner may be implemented as well or instead.

As will be understood, each of the transmitters 60-64 of FIG. 3 may transmit a signal indicative of a respective process variable (e.g., a flow, a pressure, a temperature or a level signal) to the controller 11 for use in one or more control loops or routines or for use in a monitoring routine. Other wireless devices, such as the field device 71, may receive process control signals wirelessly, and/or be configured to transmit other signals indicative of any other process parameter. Generally speaking, as illustrated in FIG. 3, the controller 11 includes a communications stack 80 that executes on a processor to process the incoming signals, a module or a routine 82 that executes on a processor to detect when an incoming signal includes a measurement update, and one or more control modules 84 which execute on a processor to perform control based on the measurement updates. The detection routine 82 may generate a flag or other signal to denote that data being provided via the communications stack 80 includes a new process variable measurement or other type of update. The new data and the update flag may then be provided to one or more of the control modules 84 (which may be function blocks) which are then executed by the controller 11 at a predetermined periodic execution rate, as described in further detail below. Alternatively, or in addition, the new data and the update flags may be provided to one or more monitoring modules or applications executed in the controller 11 or elsewhere in the control system 10.

The wireless (or other) transmitters of FIG. 3 generally result in slow or non-periodic, which includes irregular or otherwise less frequent data transmissions, between the field devices 60-64 and 71 and the controller 11. As noted above, however, the communication of measurement values from the field devices 15-22 to the controller 11 has traditionally been structured to be performed in a periodic manner at a rate much faster than the execution rate of the controller or at least much faster than the dynamic rate of the process, i.e., the inverse of the process response time (for the phenomena of the process being controlled). As a result, the control routines in the controller 11 are generally designed for periodic updates of the process variable measurement values used in the feedback loops of the controller 11.

Figure 4A:
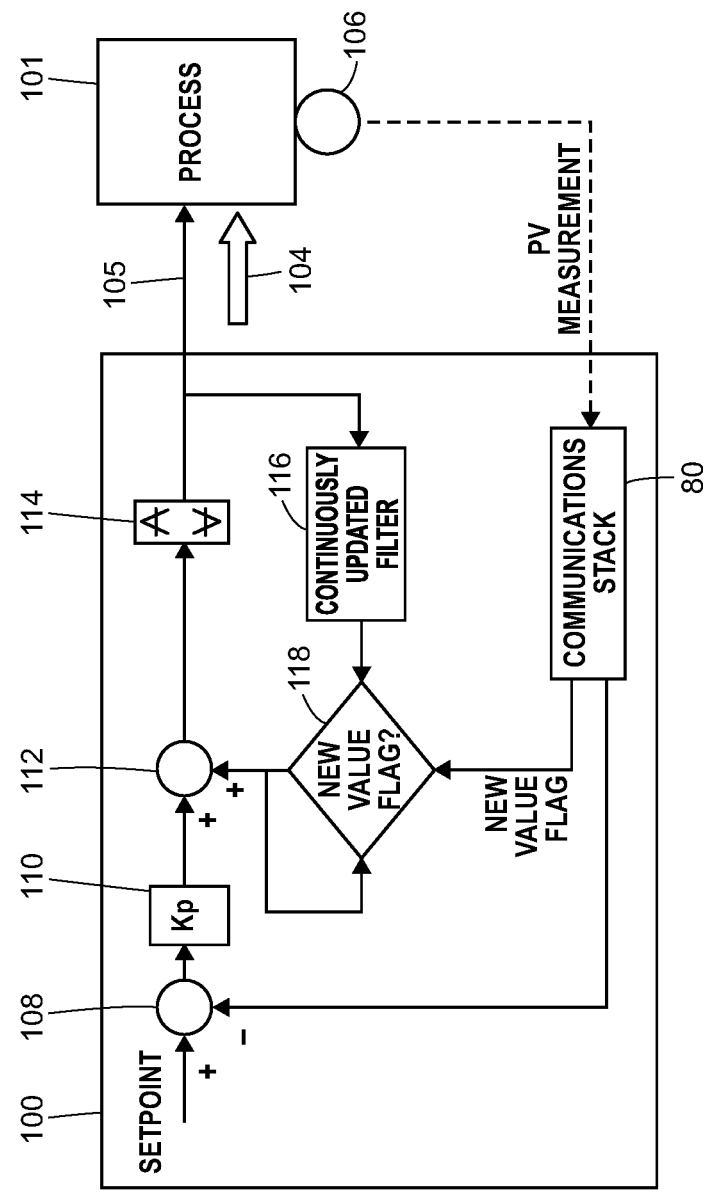
FIG. 4A is a block diagram of an example controller that allows for robust compensation of setpoint changes or feed-forward disturbances in a non-periodically updated, wireless process control system.

To accommodate the slow, non-periodic, or otherwise unavailable measurement updates (and other unavailable communication transmissions) introduced by, for example, the wireless communications between some of the field devices and the controller 11, the control and monitoring routine(s) of the controller 11 may be restructured or modified as described below to enable the process control system 10 to function properly when using slow including non-periodic or non-periodic or intermittent updates, and especially when these updates occur less frequently than the execution rate of the controller 11 and even when those updates are received at a rate that is similar to (e.g., less than 2-4 times or the same order of magnitude as, etc.) the process response rate (e.g., the inverse of the process response time of the process variable being controlled). Exemplary control schemes configured to operate using slow and/or non-periodic control-related communications is illustrated in more detail in FIGS. 4-10. For example, FIG. 4A schematically illustrates a positional type of process controller 100 coupled to a process 101. The control scheme implemented by the controller 100 (which may be the controller 11 of FIGS. 1 and 3 or a control element of a field device, e.g., one of the wireless field devices of FIG. 3, etc.) generally includes the functionality of the communications stack 80, the update detection module 82 and one or more of the control modules 84 illustrated and described in connection with FIG. 3, and produces a control signal the indicates the position to which a moveable element of a control device is to move.

In the exemplary system of FIG. 4A, the controller 100 receives a setpoint signal from, for example, one of the workstations 13 (FIGS. 1 and 3) or from any other source within or in communication with the process control system 10 and operates to generate one or more control signals 105 which are provided from an output of the controller 100 to the process 101. Besides receiving the control signal 105, the process 101 may be subjected to measured or unmeasured disturbances schematically shown by the arrow 104. Depending on the type of process control application, the setpoint signal may be changed at any time during control of the process 101, such as by a user, a tuning routine, etc. Of course, the process control signals 105 may control an actuator associated with a valve or may control any other field device to affect a response in the operation of the process 101. The response of the process 101 to changes in the process control signals 105 is measured or sensed by a transmitter, sensor or other field device 106, which may, for example, correspond to any one of the transmitters 60-64 illustrated in FIG. 3. The communication link between the transmitter 106 and the controller 100 may include a wireless connection and is illustrated in FIG. 4A using a dashed line.

In a simple embodiment, the controller 100 may implement a single/input, single/output closed-loop control routine, such as a PI control routine, which is one form of a PID control routine. Accordingly, the controller 100 includes several standard PI controller elements, including a communications stack 80, and a control signal generation unit including a summing block 108, a proportional gain element 110, a further summing block 112 and a high-low limiter 114. The control routine 100 also includes a direct feedback path including a filter 116 and an integral output switch that includes a selection block 118. The filter 116 is coupled to the output of the high-low limiter 114 and the block 118 of the switch is coupled to the output of the filter 116 and provides the integral or reset contribution or component of the control signal being generated by the controller 100 to the summing block 112.

During operation of the controller 100, the summing block 108 compares the setpoint signal with the most recently received process variable measurement value provided from the communications stack 80 within the controller 100 to produce an error signal. The proportional gain element 110 operates on the error signal by, for example, multiplying the error signal by a proportional gain value $K_P$ to produce a proportional contribution or component of the control signal. The summing block 112 then combines the output of the gain element 110 (i.e., the proportional contribution) with the integral or reset contribution or component of the control signal produced by the feedback path to produce a control signal that is not limited in nature. The limiter block 114 then performs high-low limiting on the output of the summer 112 to produce the control signal 105 to be sent to control the process 101.

Importantly, the filter 116 and the block or switch 118 within the feedback path of the controller 100 operate to produce the integral or reset contribution component of the control signal in the following manner. The filter 116, which is coupled to receive the output of the limiter 114, produces an indication of the expected process response to the control signal 105 based on the output value of the limiter 114 and the execution period or time of the control algorithm 100. The filter 116 provides this expected process response signal to the switch or block 118. The switch or block 118 samples and clamps the output of the filter 116 at the output of the switch or block 118 whenever a new process variable measurement value has been received and maintains this value until the next process variable output is received at the communications stack 80. As such, the output of the switch 118 remains the output of the filter 116 that was sampled at the last measurement update.

The expected process response to changes in the output of the summer 108, as produced by the filter 116, may be approximated using a first order model as described in more detail below. More generally, however, the expected process response may be produced using any appropriate model of the process 101, and is not limited to a model incorporated in a feedback path of the controller 100, or to a filter or a model associated with determining an integral or reset contribution for a control signal. For example, controllers utilizing a model to provide the expected process response may incorporate a derivative contribution such that the control routine 100 implements a PID control scheme. Several examples that incorporate exemplary types of derivative contributions are described below in connection with FIGS. 6-8.

Prior to discussing the operation of the filter 116 of FIG. 4A in more detail, it is useful to note that a traditional PI controller may be implemented using a positive feedback network to determine the integral or reset contribution. Mathematically, it can be shown that the transfer function for a traditional PI implementation is equivalent to the standard formulation for unconstrained control, i.e., where the output is not limited. In particular:

$$\frac{O(s)}{E(s)} = K_P\left(1 + \frac{1}{sT_{Reset}}\right)$$

where $K_P$=Proportional Gain
$T_{Reset}$=Reset, seconds
O(s)=Control Output
E(s)=Control Error One advantage of using the positive feedback path within the controller 100 as illustrated in FIG. 4A is that the reset contribution is automatically prevented from winding up when the controller output is high or low limited, i.e., by the limiter 114.

In any event, the control technique described below enables using the positive feedback path for determining the reset or integral contribution when the controller receives non-periodic updates of the process variable, while still enabling a robust controller response in the event of setpoint changes or feed-forward changes that occur between the receipt of new process variable measurements. Specifically, to provide robust setpoint change controller operation, the filter 116 is configured to calculate a new indication or value of an expected process response during each or every execution of the controller 100 regardless of whether this output of the filter is ever provided to the summing block 112. As a result, the output of the filter 116 is regenerated anew during each execution cycle of the controller routine, even though only the output of the filter 116 generated immediately after the controller 100 receives a new process measurement update from communications stack 80 is used as the integral or reset contribution in the summer 112.

In particular, the new indication of the expected response as produced by the filter 116 is calculated during each controller execution cycle from the current controller output (i.e., the control signal after the limiter 114), the indication of an expected response produced by the filter 116 produced during the last (i.e., immediately preceding) controller execution cycle, and the controller execution period. As a result, the filter 116 is described herein as being continuously updated because it is executed to produce a new process response estimation during each controller execution cycle. An example equation that may be implemented by the continuously updated filter 116 to produce a new expected process response or filter during each controller execution cycle is set forth below:

$$F_N = F_{N-1} + (O_{N-1} + F_{N-1}) * \left(1 - e^{\frac{-\Delta T}{T_{Reset}}}\right)$$

where $F_N$=New filter output
$F_{N-1}$=Filter oil last execution
$O_{N-1}$=Controller output last execution
$\Delta T$=Controller execution period Here, it will be noted that the new filter output $F_N$ is iteratively determined as the most previous filter output $F_{N-1}$ (i.e., the current filter output value) plus a decaying component determined as the difference between the current controller output value $O_{N-1}$ and the current filter output value $F_{N-1}$ multiplied by a factor dependent on the reset time $T_{Reset}$ and the controller execution period $\Delta T$. Using a filter that updates continuously in this manner, the control routine 100 is better able to determine the expected process response when calculating the integral control signal input when a new process variable measurement is received, thereby being more reactive to a changes in the setpoint or other feed-forward disturbances that occur between the receipt of two process variable measurements. More particularly, it will be noted that a change in the setpoint (without the receipt of a new process measurement value) will immediately result in a change in the error signal at the output of the summer 108 which changes the proportional contribution component of the control signal and thus changes the control signal. As a result, the filter 116 will immediately begin producing a new expected response of the process to the changed control signal and will thus update its output prior to the controller 100 receiving a new process measurement value. Then, when the controller 100 receives a new process measurement value, and a sample of the filter output is clamped to the input of the summer 112 by the switch 118 to be used as the integral or reset contribution component of the control signal, the filter 116 has iterated to an expected process response that, to some degree at least, has reacted to or incorporated the response of the process 101 to the change in the setpoint.

In the past, such as in the systems described in U.S. Pat. Nos. 7,587,252 and 7,620,460, the reset contribution filter used in a feedback path of a non-periodically updated controller only calculated a new indication of an expected response when a new process variable measurement value was available. As a result, the reset contribution filter did not compensate for setpoint changes or feed-forward disturbances that occurred between receipt of process variable measurements because the setpoint changes or feed-forward disturbances were wholly independent from any measurement value updates. For example, if a setpoint change or feed-forward disturbance occurred between two measurement updates, the expected process response of the controller was likely to be distorted because the calculation of the new indication of the expected response was based on the time since the last measurement update and the current controller output 105. As a result, the filter 116 could not begin to account for the time changes in the process (or the control signal) that resulted from a setpoint change (or other feed-forward disturbance) that occurred between the receipt of two process variable measurement values at the controller.

As will be understood, however, the control routine 100 of FIG. 4A provides an expected process response by basing its calculations on non-periodic measurement values while, in addition, determining the expected response between the receipt of two measurement values to account for changes caused by a change in the setpoint (or any measured disturbance used as a feed-forward input to the controller 100). Thus, the control technique described above is able to accommodate for setpoint changes, feed-forward action on measured disturbances, etc., that may affect the expected process response and thus provide a more robust control response.

As will be understood, the control technique illustrated in FIG. 4A calculates an indication of an expected response via the continuously updated filter 116 (e.g. the reset contribution filter) for each execution of the control block or routine 100. Here, the controller 100 configures the continuously updated filter 116 to calculate a new indication of an expected response for each execution of the control block. However, to determine if the output of the filter 116 should be used as an input to the summing block 112, the communications stack 80 and, in some examples, the update detection module 82 (FIG. 3), process the incoming data from the transmitter 106 to generate a new value flag for the integral output switch 118 when a new process variable measurement value is received. This new value flag informs the switch 118 to sample and clamp the filter output value for this controller iteration to the input of the summer 112.

Regardless of whether a new value flag is communicated, the continuously updated filter 116 continues to calculate an indication of an expected response for each iteration of the control routine. This new indication of an expected response is delivered to the integral output switch 118 each execution of the control block. Depending on the presence of the new value flag, the integral output switch 118 switches between allowing the new indication of the expected response from the continuously updated filter 116 to pass through to the summing block 112 and maintaining the signal that was previously delivered to the summing block 112 during the last execution of the control block. More particularly, when a new value flag is communicated, the integral output switch 118 allows the most recently calculated indication of the expected response from the continuously updated filter 116 to pass to the summing block 112. Conversely, if the new value flag is not present, then the integral output switch 118 resends the indication of the expected response from the last control block iteration to the summing block 112. In other words, the integral output switch 118 clamps onto the new indication of the expected response each time a new value flag is communicated from the stack 80, but does not allow any newly calculated indication of the expected response to reach the summing block 112 if a new value flag is not present.

This control technique allows the continuously updated filter 116 to continue to model the expected process response regardless of whether a new measurement value is communicated. If the control output changes as a result of a setpoint change or a feed-forward action based on a measured disturbance, irrespective of the presence of a new value flag, the continuously updated filter 116 correctly reflects the expected process response by calculating a new indication of an expected response at each control routine iteration. However, the new indication of the expected response (i.e. the reset contribution or integration component) will only be incorporated into the controller calculations when a new value flag is communicated (via the integral output switch 118).

Figure 4B:
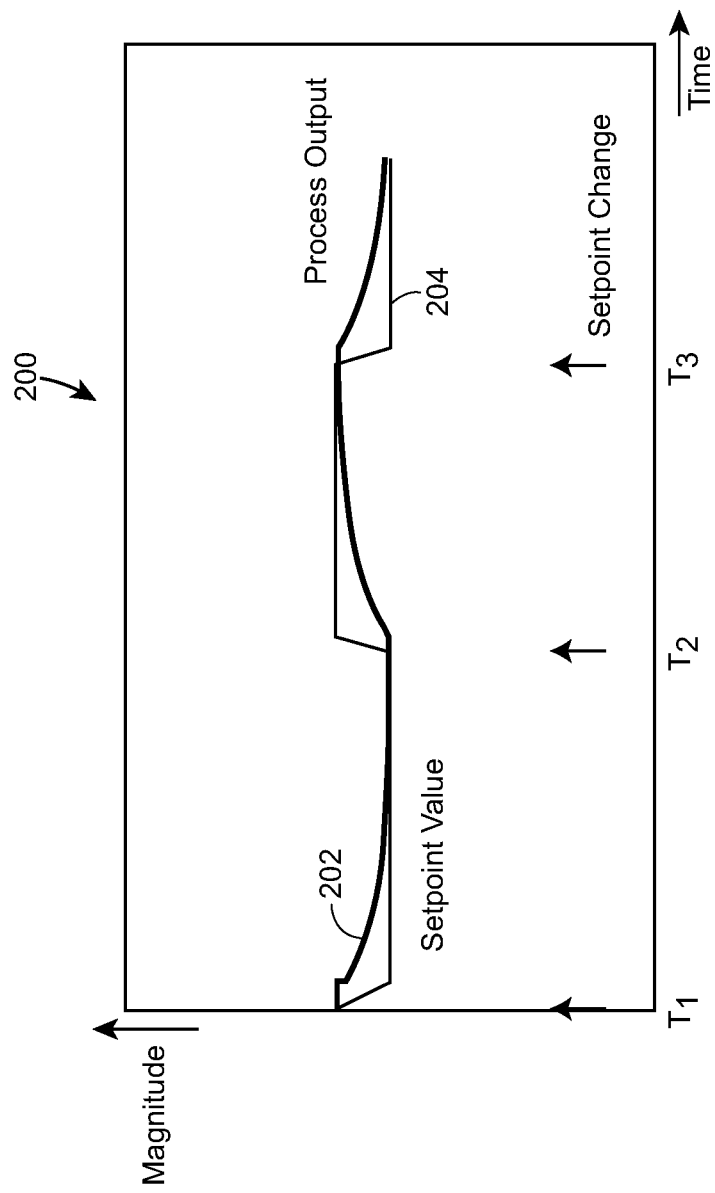
FIG. 4B is a graph illustrating the process output response of an example controller of FIG. 4A as the controller responds to several setpoint changes.

A graph 200 illustrated in FIG. 4B depicts a simulated operation of the controller 100 of FIG. 4A in driving a process output signal 202 to a steady state value as the controller 100 responds to several setpoint changes. In FIG. 4B, a process output signal 202 (illustrated as a bold line) is shown vis-à-vis a setpoint value signal 204 (illustrated as a thinner line) during wireless operation in a process control system. When a setpoint change occurs, as indicated by the arrows along the time axis at the bottom of the graph 200, the controller 102 responds by producing a control signal that drives the process output to react to the new setpoint value (i.e. steady state value). For example, as illustrated in FIG. 4B, a setpoint change occurs at the time $T_1$ as evidenced by the setpoint value signal 204 significantly changing its magnitude from a higher value to a lower value. In response, the controller 102 drives the process variable associated with the setpoint to the new steady state or setpoint value in a smooth transient curve as exhibited by the output signal 202 between the times $T_1$ and $T_2$. Similarly, in FIG. 4B, a second setpoint change occurs at the time $T_2$ as evidenced by the magnitude of setpoint value signal 204 significantly changing from a lower value to a higher value. In response, the controller 102 controls the process variable associated with the setpoint change to the new steady state or setpoint value in a smooth transient curve as shown by the output signal 202 between the times $T_2$ and $T_3$. As a result, as can be seen from FIG. 4B, the controller 100 implementing the control routine described above allows for compensation of setpoint changes in a non-periodic wireless control system in a robust manner. Because feed-forward disturbances may be measured and included in the control action, the controller 100 implementing the control routine described above may also allow for compensation of feed-forward changes in the control output in a non-periodic wireless control system.

It should be noted that the simple PI controller configuration of FIG. 4A uses the output of the filter 116 directly as the reset contribution to the control signal, and in this case the reset contribution of a closed-loop control routine (e.g. the continuously updated filter equation presented above) may provide an accurate representation of the process response in determining whether the process exhibits steady-state behavior. However, other processes, such as deadtime dominant processes, may require the incorporation of additional components in the controller of FIG. 4A in order to model the expected process response. With regard to processes that are well represented by a first-order model, the process time constant may generally be used to determine the reset time for the PI (or PID) controller. More specifically, if the reset time is set equal to the process time constant, the reset contribution generally cancels out the proportional contribution such that, over time, the control routine 100 reflects the expected process response. In the example illustrated in FIG. 4A, the reset contribution may be effected by a positive feedback network having a filter with the same time constant as the process time constant. While other models may be utilized, the positive feedback network, filter, or model provides a convenient mechanism for determining the expected response of a process having a known or approximated process time constant. For those processes that require PID control, the derivative contribution, also known as rate, to the PID output may also be recomputed and updated only when a new measurement is received. In those cases, the derivative calculation may use the elapsed time since the last new measurement. Some examples of controllers that may use other controller components to control more complex processes using non-periodic receipt of process measurements, but that may use the filtering technique of FIG. 4A to provide for robust control in response to setpoint changes will be described below in conjunction with FIGS. 5-8.

Figure 5:
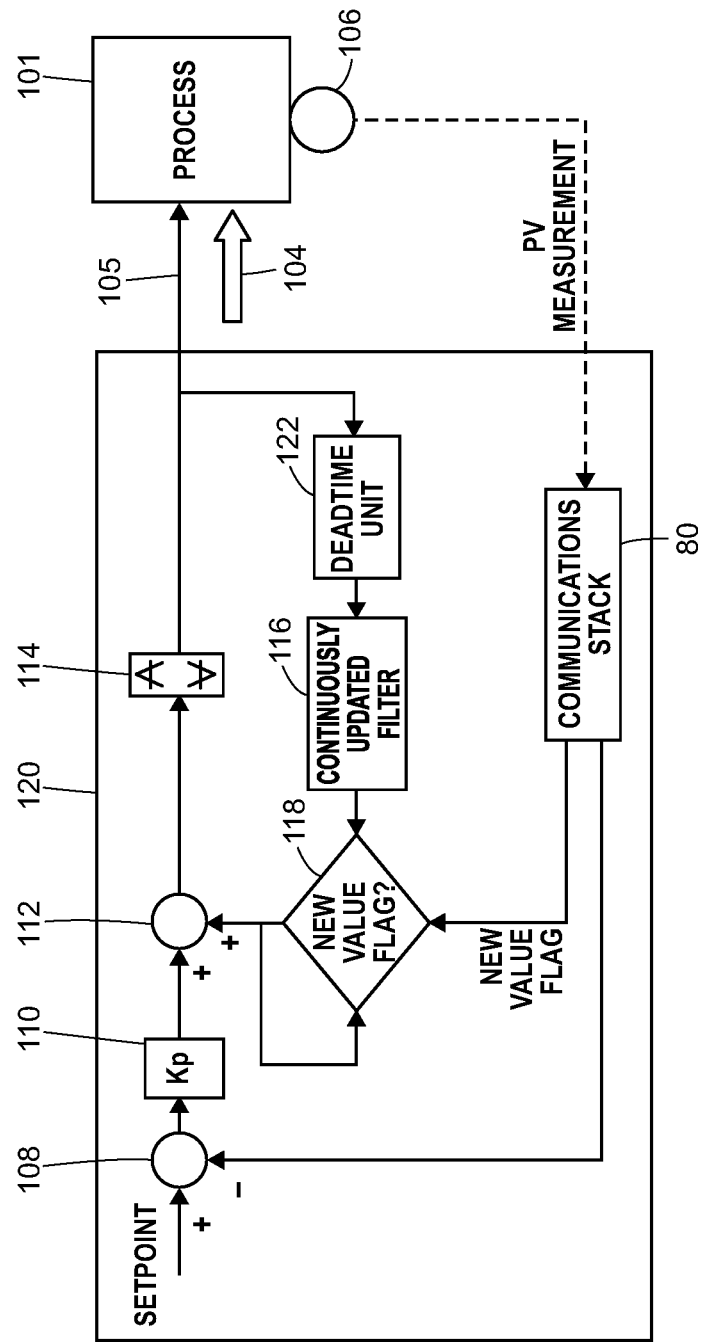
FIG. 5 is a block diagram of an example controller that performs setpoint change compensation in a non-periodically updated process control system in which the controller compensates for a process and/or measurement delay in the feedback signal.

Referring now to FIG. 5, an alternative controller (or control element) 120 configured in accordance with the control technique, as described above, is similar in many respects to the controller 100 illustrated in FIG. 4A. As a result, elements common to both controllers are identified with like reference numerals. The controller 120, however, incorporates an additional element into the control routine that determines the expected process response between measurement transmissions. In this case, the process 101 may be characterized as having a considerable amount of deadtime and, as a result, a deadtime unit or a block 122 is included in the controller model for deadtime compensation. The incorporation of the deadtime unit 122 generally helps to arrive at a more accurate representation of the process response. More specifically, the deadtime unit 122 may be implemented in any desired fashion and may include or utilize methods common to Smith predictors or other known control routines. However, in this situation, the continuously updated filter 116 and the switch module 118 operate in the same manner as described above with respect to the controller 100 of FIG. 4A to provide for robust control in response to setpoint changes.

Figure 6:
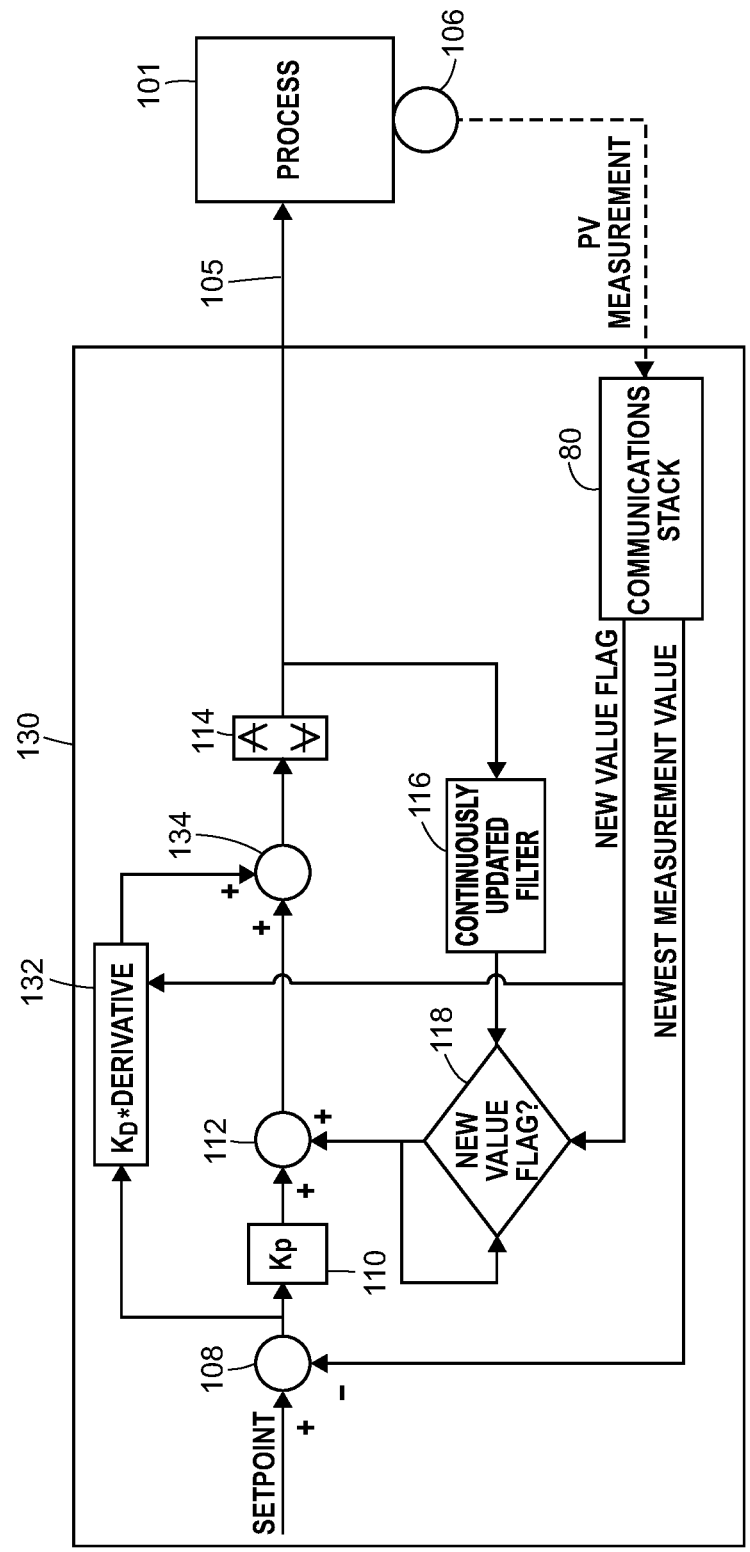
FIG. 6 is a block diagram of an example controller that performs setpoint change compensation in a non-periodically updated process control system in which the process controller uses a derivative, or a rate, contribution to determine a control signal.

FIG. 6 depicts another alternative controller (or control element) 130 that differs from the controller 100 described above in FIG. 4A in that a derivative, or rate, contribution component is incorporated into the controller 130. By incorporating the derivative contribution, the control routine implemented by the controller 130 includes an additional feedback mechanism such that, in some cases, a proportional-integral-derivative (PID) control scheme is implemented.

The control routine or technique of FIG. 6 includes a derivative contribution that is configured in a manner similar to that described above in connection with the integral contribution of FIG. 4A to accommodate non-periodic or otherwise unavailable updates of the process measurement. The derivative contribution may be restructured to be based on the elapsed time since the last measurement update. In this manner, a spike in the derivative contribution (and the resultant output signal) is avoided. More particularly, the derivative contribution of FIG. 6 is determined by a derivative block 132 that receives the error signal from the summing block 108 in parallel with the elements dedicated to the proportional and integral contributions. While other PID configurations may also be utilized (e.g., a serial configuration), the proportional, integral and derivative contributions are combined at a summing block 134 as shown in FIG. 6.

To accommodate unreliable transmissions and, more generally, the unavailability of measurement updates, the derivative contribution is maintained at the last determined value until a measurement update is received, as indicated by the new value flag from the communications stack 80. This technique allows the control routine to continue with periodic execution according to the normal or established execution rate of the control routine. Upon reception of the updated measurement, the derivative block 132, as illustrated in FIG. 6, may determine the derivative contribution in accordance with the following equation:

$$O_D = K_D \cdot \frac{e_N - e_{N-1}}{\Delta T}$$

where $e_N$=Current error
$e_{N-1}$=Last error
$\Delta T$=Elapsed time since a new value was communicated
$O_D$=Controller derivative term
$K_D$=Derivative gain factor With this technique for determining the derivative contribution, the measurement updates for the process variable (i.e., control input) can be lost for one or more execution periods without the production of output spikes. When the communication is reestablished, the term ($e_N$-$e_{N-1}$) in the derivative contribution equation may generate the same value as that generated in the standard calculation of the derivative contribution. However, for a standard PID technique, the divisor in determining the derivative contribution is the execution period. In contrast, the control technique utilizes the elapsed time between two successfully received measurements. With an elapsed time greater than the execution period, the control technique produces a smaller derivative contribution, and reduced spiking, than the standard PID technique.

To facilitate the determination of the elapsed time, the communications stack 80 may provide the new value flag described above to the derivative block 132 as shown in FIG. 6. Alternative examples may include or involve detection of a new measurement, or update, based on its value. Also, the process measurement may be used in place of the error in the calculation of the proportional or derivative component. More generally, the communication stack 80 may include or incorporate any software, hardware or firmware (or any combination thereof) to implement a communications interface with the process 101, including any field devices within the process 101, process control elements external to the controller, etc. However, in the controller 130 of FIG. 6, the continuously updated filter 116 and the switch module 118 operate the same as described above with respect to the controller 100 of FIG. 4A to provide for robust control in response to setpoint changes.

An actuator or other downstream element controlled by the controllers described in connection with FIGS. 3, 4A, and 5-6 may still receive a control signal with sudden changes, especially after periods of no communication between the controller or control element to the downstream actuator or other element. The resultant control action may be sufficiently abrupt in some cases to impact plant operations and such abrupt changes may lead to unsuitable levels of instability.

The potential for abrupt control changes because of loss of communications between the controller and the downstream element may be addressed by incorporating actual downstream data in place of the controller output during the last execution period when determining the feedback contribution(s) to the control signal. Generally speaking, such actual downstream data provides a feedback indication of a response to the control signal, and thus may be measured or calculated by a downstream element (e.g., a process control module) or a device (e.g., an actuator) that receives the control signal. Such data is provided in lieu of an implied response to the control signal, such as the controller output from the last execution. As shown in FIGS. 4A and 5-6, the continuously updated filter 116 receives the control signal 105 as an implied indication of the downstream response. The use of such implied data effectively assumes that the downstream element, such as an actuator, received the communications of the control signal and, thus, is responding appropriately to the control signal. The actual feedback data also differs from other response indications, such as the measurement of the process variable being controlled.

Figure 7:
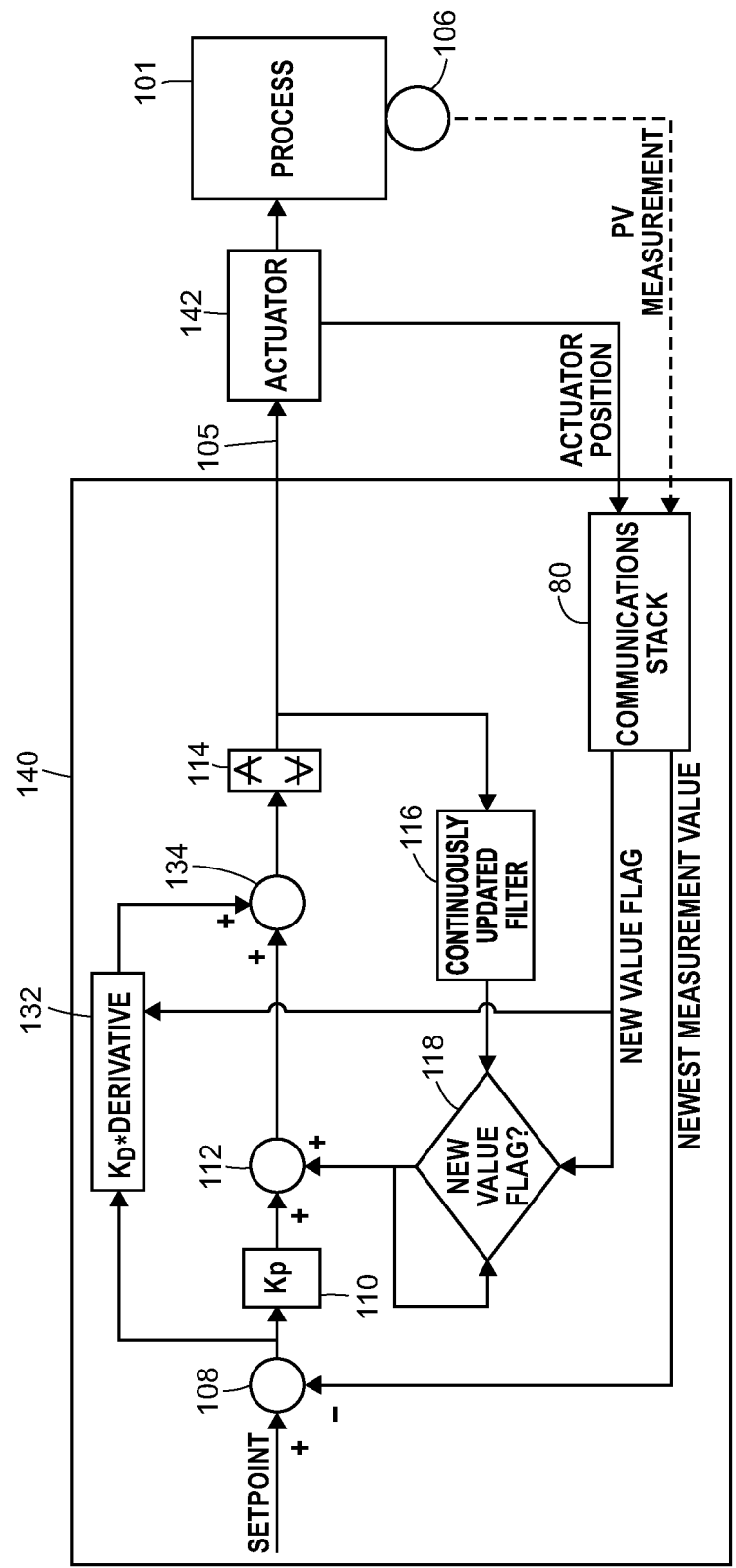
FIG. 7 is a block diagram of an example controller that performs setpoint change compensation in a non-periodically updated process control system in which the process controller receives additional controller-input data provided from a field device, a control element, or other downstream device to affect a response in the operation of the process.

FIG. 7 depicts an exemplary controller 140 that receives actuator position data from a downstream device or element responsive to the control signal. The downstream device or element often corresponds with an actuator providing a measurement of actuator position. More generally, the downstream device or element may correspond with, or include, a PID control block, control selector, splitter or any other device or element controlled by the control signal. In the exemplary case shown, the actuator position data is provided as an indication of the response to the control signal. As such, the actuator position data is utilized by the controller 140 during periods of continued execution of the control routine despite the absence of measurement updates of the process variable. To this end, a continuously updated filter 116 may receive the actuator position data via a communications stack 146 that establishes an interface for incoming feedback data. In this exemplary case, the feedback data includes two indications of responses to the control signal, the actuator position and the process variable.

As with the previous examples, the continuously updated filter 116 is configured to accommodate situations involving the absence of measurement updates for the process variable. The continuously updated filter 116 similarly recalculates its output during such absences despite the fact that only the filter output generated after receipt of a new measurement value flag is used in the summer 112. However, upon reception of a measurement update, the continuously updated filter 116 no longer relies upon feedback of the control signal to modify its output. Rather, the actual response data from the actuator is utilized as shown below:

$$F_N = F_{N-1} + (A_{N-1} - F_{N-1}) * \left(1 - e^{\frac{-\Delta T}{T_{Reset}}}\right)$$

where $F_N$=New filter output
$F_{N-1}$=Filter output last execution
$A_{N-1}$=Controller output last execution
$\Delta T$=Controller execution period
$T_{Reset}$=Reset time The use of an actual indication of the response to the control signal can help improve the accuracy of the control techniques, both during periods of periodic communications and after a period of non-periodic or lost communications from the PID control element to the downstream element, e.g., an actuator. However, the transmission of the actual response indication will typically require additional communications between a field device and the controller, if implemented in different devices. Such communications may be wireless, as described above, and therefore may be susceptible to unreliable transmissions or power constraints. Other reasons may also lead to the unavailability of the feedback data.

As described below, the control techniques discussed herein can also address situations in which such response indications are not communicated in a periodic or timely manner. That is, application of the control techniques need not be limited to the absence of measurement updates for the process variable. Rather, the control techniques may be advantageously utilized to address situations involving the absence of other response indications, such as the position of an actuator or the output of a downstream control element. Still further, the control techniques may be utilized to address situations involving the loss, delay or other unavailability of transmissions from the controller (or control element) to the downstream element, such as a field device (e.g., actuator) or another control element (e.g., cascaded PID control, splitter, etc.).

The wireless or other unreliable transmission of additional data to the controller or control element (i.e., the response indication or downstream element feedback), or from the controller or control element (i.e., the control signal), provides additional potential for communication issues and/or problems. As described above, feedback from the downstream element (e.g., actuator) may be involved in determining the integral contribution (or other control parameter or contribution). In this example, the control routine relies on two feedback signals rather than the single process variable fed back in the examples described above. Moreover, if the control signal never reaches the downstream element, the process will not receive the benefit of the control scheme. Transmissions of either one of these signals may be delayed or lost and, thus, the techniques described herein address either eventuality.

The absence of the response indication involved in the filter or other control computations may be addressed by maintaining the indication of the expected response (or other control signal component) until an update is received.

When the control signal does not reach the downstream element, the response indication (i.e., feedback) from the downstream element will not be changing. In such cases, the lack of a change in value may trigger logic in the controller (or control element) to similarly maintain the indication of the expected response (or other control signal component) until a change in value is received.

The control techniques may also be implemented in scenarios where actual feedback data is either not desired or is unavailable. The former case may be advantageous in those situations where the simplicity of using an implied response to the control signal is beneficial. For instance, the communication of the actual feedback data may be problematic or impractical. The latter case may involve actuators or other devices not configured to provide position measurement data, as described above. Older devices may not have such capabilities.

Figure 8:
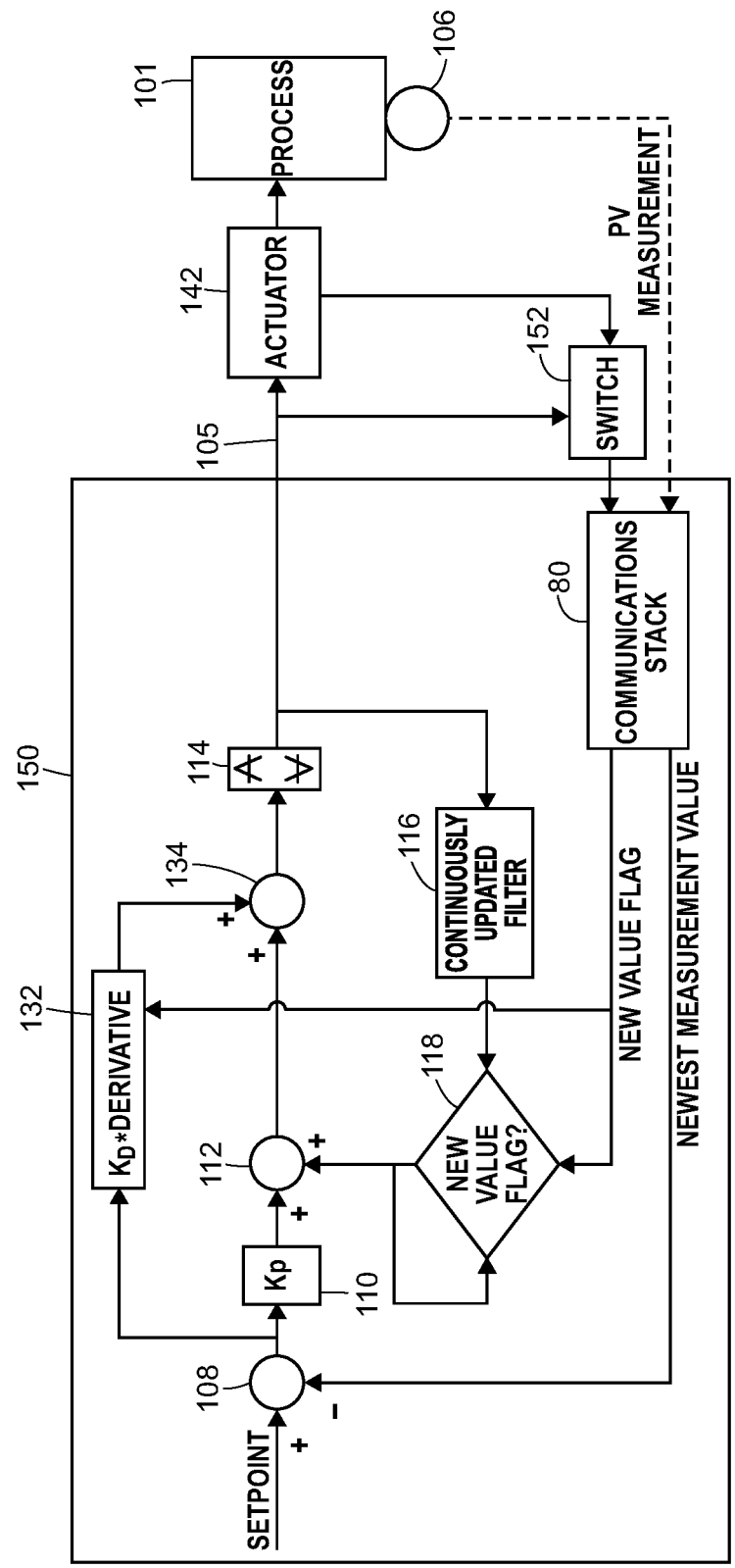
FIG. 8 is a block diagram of an example controller that performs setpoint change compensation in a non-periodically updated process control system in which the process controller accommodates the use of either actual or implied controller-input data for a field device.

To accommodate such devices, a switch or other device may be provided to allow either an implied or actual response indication to be used by the control techniques. As illustrated in FIG. 8, a controller 150 is coupled to a switch 152, which in turn receives both the implied and actual response indications. In this case, the controller 150 may be identical to any of the above-described controllers, inasmuch as the implementation of the control schemes is not dependent upon knowing the type of response indication. The switch 152 may be implemented in software, hardware, firmware, or any combination thereof. Control of the switch 152 may be independent of the controller 150 and the implementation of any control routine. Alternatively or additionally, the controller 150 may provide a control signal to configure the switch 152. Furthermore, the switch 152 may be implemented as a part of the controller itself and, in some cases, may be integrated as a part of the communications stack or other portion of the controller.

Practice of the control methods, system and techniques is not limited to any one particular wireless architecture or communication protocol. Suitable exemplary architectures and communication support schemes are described U.S. patent application Ser. No. 11/156,215 entitled "Wireless Architecture and Support for Process Control Systems," which was filed on Jun. 17, 2005, the entire disclosure of which is hereby incorporated by reference. In fact, the modifications to the control routines are well-suited for any context in which the control routine is implemented in a periodic manner, but without process variable measurement updates for each control iteration. Other exemplary contexts include where a sampled value is provided irregularly or more seldom by, for instance, an analyzer or via lab samples.

Practice of the control technique is not limited to use with single-input, single-output PID control routines (including PI and PD routines), but rather may be applied in a number of different multiple-input and/or multiple-output control schemes and cascaded control schemes. More generally, the control technique may also be applied in the context of any closed-loop model-based control routine involving one or more process variables, one or process inputs or other control signals, such as model predictive control (MPC).

Figure 9:
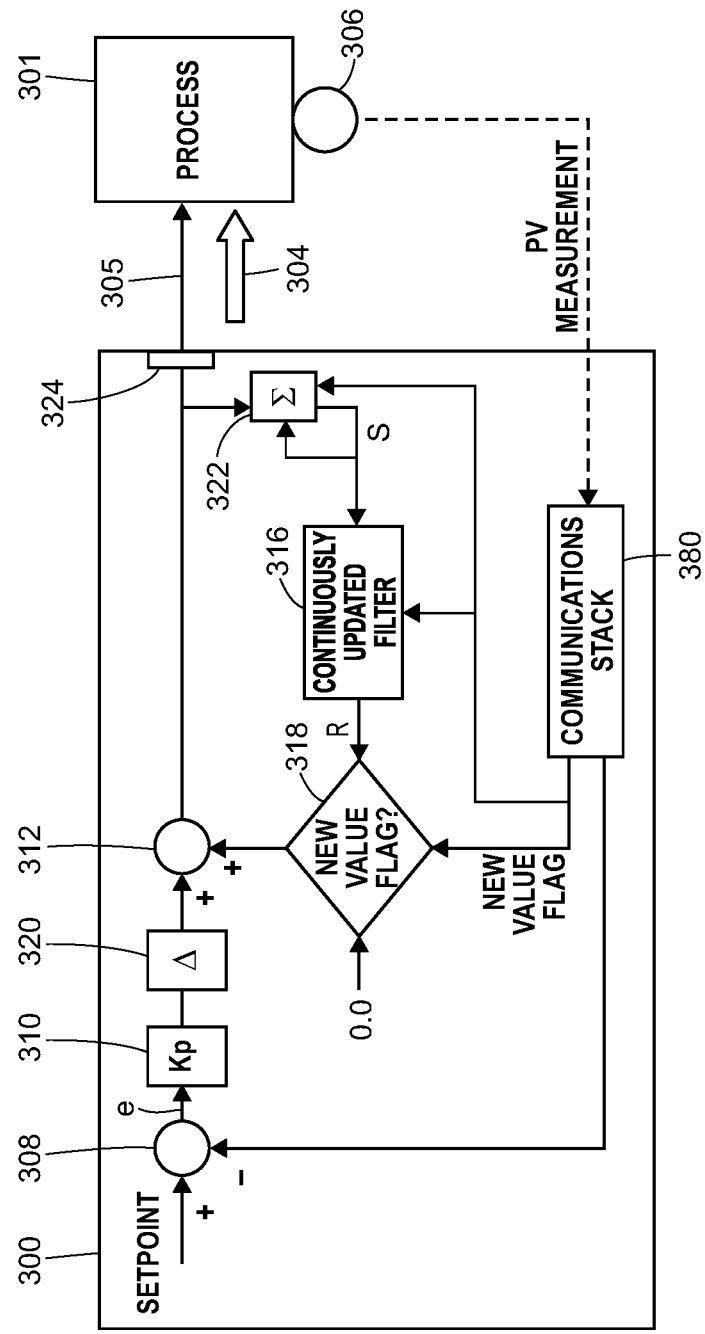
FIG. 9 is a block diagram of an example velocity based PI controller that allows for robust compensation of setpoint changes or feed-forward disturbances in a process control system in response to slowly received process variable measurement signals.

FIG. 9 illustrates a further example control system using the principles described herein but that is configured to have a controller 300 in the form of a velocity based controller. In the exemplary system of FIG. 9, the controller 300 receives a setpoint signal from, for example, one of the workstations 13 (FIGS. 1 and 3) or from any other source within or in communication with the process control system and operates to generate one or more control signals 305 which are provided from an output of the controller 300 to the process 301. Besides receiving the control signal 305, the process 301 may be subjected to measured or unmeasured disturbances schematically shown by the arrow 304 in FIG. 4. Depending on the type of process control application, the setpoint signal may be changed at any time during control of the process 301, such as by a user, a tuning routine, etc. Of course, the process control signals 305 may control an actuator associated with a valve or may control any other field device to affect a response in the operation of the process 301. The response of the process 301 to changes in the process control signals 305 is measured or sensed by a transmitter, sensor or other field device 306, which may, for example, correspond to any one of the transmitters 60-64 illustrated in FIG. 3. The communication link between the transmitter 306 and the controller 300 may include a wireless connection and is illustrated in FIG. 9 using a dashed line. However, this link may also be a wired communication link or other type of communication link. It will be assumed, for the purpose of discussion, that the transmitter 306, which is measuring the process variable being controlled (i.e., the controlled variable) or a proxy variable that is correlated with the controlled process variable, at a slow or intermittent update rate. This slow update rate may be periodic or non-periodic and is assumed to be on the same order of magnitude as the process response rate of the process dynamics associated with the controlled process variable. Thus, the process variable measurements are provided once per a time interval that is larger than response time of the process, once per a time interval similar to the process response time or once per a time interval that is slightly less than the process response time. Thus, in some cases, this update rate may be ½ to ¼ of the process response rate (the inverse of the process response time).

In a simple embodiment illustrated in FIG. 9, the controller 300 may implement a single/input, single/output closed-loop control routine, such as a PI control routine, which is one form of a PID control routine. Accordingly, the controller 300 includes several standard PI controller elements, including a communications stack 380, and a control signal generation unit including a summing block 308, a proportional gain element 310, and a further summing block 312. The control routine 300 also includes a direct integral feedback path including a filter 316 and an integral output switch that includes a selection block 318. However, in this case, the PI controller of FIG. 9 is configured to perform positional or differential control calculations on the proportional and integral components of the control signal. As such, the controller 300 also includes a differential block 320 disposed in the proportional component calculation path, a summer 322 disposed in the integral component calculation path and a block 324 that uses the differentially calculated control component at the input thereto to produce the control signal 305. Generally speaking, the block 324 scales the change in the position (velocity) control signal, as generated within the controller 300, or otherwise converts this signal to an analog or digital signal that is sent to the control device to instruct the control device to move a certain amount in one direction or another over a particular period of time. This block 324 may, for example, send a pulse width modulated signal, a pulsed signal, a digital single indicative of a turn-on time, or any other signal that indicates a magnitude of a positional change over time to the control device.

As illustrated in FIG. 9, the integral filter 316 is coupled to the output of the summer 322 which, in turn, is coupled to receive the output of the summer 312, while the block 318 of the switch is coupled to the output of the filter 316 and provides the integral or reset contribution or component of the control signal being generated by the controller 300 to the summing block 312.

During each iteration or operation of the controller 300, the summing block 308 compares the setpoint signal with the most recently received process variable measurement value provided from the communications stack 380 within the controller 300 to produce an error signal (e). The proportional gain element or block 310 operates on the error signal e by, for example, multiplying the error signal e by a proportional gain value $K_P$ to produce a proportional contribution or component of the velocity control signal. The difference block 320 then determines the change in the proportional gain value since the last controller iteration by determining the difference between the current output of the gain block 310 and the most recent value of the gain block 310 (produced during the last or immediately preceding controller iteration). The summing block 312 then combines the output of the change unit 320 (i.e., the velocity based proportional contribution) with the integral or reset contribution or component of the control signal produced by the integral feedback path to produce a velocity control signal 326 which is provided to the output block 324.

Importantly, however, the summer 322, the filter 316, and the block or switch 318 within the integral feedback path of the controller 300 operate to produce the integral or reset contribution component of the control signal in the following manner. Here, the summer 322 is coupled to receive the output of the summer 312 (i.e., the velocity based control signal representing the change in the position of moveable control element) during each controller iteration and sums that value with the previous output S of the summer 322 (generated during the last iteration of the controller 300) to thereby, in effect, integrate or sum up the change in the change of the output signal over a particular period of time. The new output S of the summer 322 is provided to the integral filter 316 which produces an indication of the expected process response to the control signal 305, indicated in FIG. 9 as R. The filter 316 provides this expected process response signal R to the switch or block 318. As indicated in FIG. 9, however, the switch or block 318 samples and clamps the output of the filter 316 at the output of the switch or block 318 whenever a new process variable measurement value has been received but otherwise provides a zero (0.0) value to the summer 312 as the integral control contribution during those control iterations in which no new process variable measurement is available. As such, the output of the switch 318, which is provided as the integral control contribution to generate a new control signal during each controller iteration, is the output of the filter 316 only during controller iterations at which a new process variable measurement is available to be used by the controller 300 and is zero (0.0) otherwise. After each time that the new value flag produced by the communications stack 380 is set (indicating that a new process variable measurement value is available at the controller 300), the summer 322 sets it output to zero and begins summing over a new period of time. Thus, in effect, the summer 322 sums the change in the control output signal over each controller iteration between process variable measurement updates and resets whenever (during the controller iteration after) a new process variable measurement update is received at the controller 300.

The expected process response to changes in the control signal, as produced by the filter 316, may be approximated using a first order model as described in more detail below. More generally, however, the expected process response may be produced using any appropriate model of the process 301, and is not limited to a model incorporated in a feedback path of the controller 300, or to a filter or a model associated with determining an integral or reset contribution for a control signal. For example, controllers utilizing a model to provide the expected process response may incorporate a derivative contribution such that the control routine 300 implements a PID control scheme. An example that incorporate an exemplary derivative contribution is described below in connection with FIG. 10.

In any event, the control technique described below enables using the positive feedback path for determining the reset or integral contribution when the controller 300 receives slow or non-periodic updates of the process variable, while still enabling a robust controller response in the event of setpoint changes or feed-forward changes that occur between the receipt of new process variable measurements. Specifically, the filter 316 is configured to calculate a new indication or value of an expected process response during each or every execution of the controller 300 regardless of whether this output of the filter 316 is ever provided to the summing block 312 as the integral component of the control signal. As a result, the output of the filter 316 is regenerated anew during each execution cycle of the controller routine, even though only the output of the filter 316 generated immediately after (or during the execution cycle at which) the controller 300 receives a new process measurement update from communications stack 380 is used as the integral or reset contribution in the summer 312.

In particular, the new indication of the expected response R as produced by the filter 316 is calculated during each controller execution cycle from the current summer output S (i.e., the summed change in the control signal output by the summer 312 since the last process variable measurement update), the indication of an expected response produced by the filter 316 produced during the last (i.e., immediately preceding) controller execution cycle, and the controller execution period. As a result, the filter 316 is described herein as being continuously updated because it is executed to produce a new process response estimation during each controller execution cycle. An example equation that may be implemented by the continuously updated filter 316 to produce a new expected process response or filter during each controller execution cycle is set forth below:

$$R_N = R_{N-1} + (S_{N-1} - R_{N-1}) * \left(1 - \frac{-\Delta T}{e^{T_{Reset}}}\right)$$

where $R_N$=New fitter Output
$R_{N-1}$=Fitter output last execution
$S_{N-1}$=Integral path summer output last execution
$\Delta T$=Controller execution period
$e^{T_{Reset}}$=Integral time period Here, it will be noted that the new filter output $R_N$ is iteratively determined as the most previous filter output $R_{N-1}$ (i.e., the current filter output value) plus a decaying component determined as the difference between the summed change in the current controller output value $S_{N-1}$ from the summer 322 and the current filter output value $R_{N-1}$ multiplied by a factor dependent on the reset time $T_{Reset}$ and the controller execution period $\Delta T$. Using a filter that updates continuously in this manner, the control routine 300 is better able to determine the expected process response when calculating the integral control signal input when a new process variable measurement is received, thereby being more reactive to a changes in the setpoint or other feed-forward disturbances that occur between the receipt of two process variable measurements. However, this integral path calculation prevents the control system from winding up in the presence of slowly received or intermittent process variable feedback measurements. More particularly, it will be noted that a change in the setpoint (without the receipt of a new process measurement value) will immediately result in a change in the error signal at the output of the summer 308 which changes the proportional contribution component of the velocity control signal 326 and thus changes the control signal 305. As a result, the summer 322 will increase its output S by that amount and the filter 316 will then begin producing a new expected response of the process to the changed control signal and will thus update its output prior to the controller 300 receiving a new process measurement value. Then, when the controller 100 receives a new process measurement value, and a sample of the filter output is clamped to the input of the summer 312 by the switch 318 to be used as the integral or reset contribution component of the control signal, the filter 316 has iterated to an expected process response that, to some degree at least, has reacted to or incorporated the response of the process 301 to the change in the setpoint based on previously sent control signal 305. However, this integral value is only added into the control signal 326 when a new process measurement value is received, to enable the error signal e produced by the summer 308 to reflect changes in the process variable between times that the process variable measurements are received at the controller 300. At controller iterations between the times at which a process variable measurement is received, the integral component provided to the summer 312 is set to zero. This technique, prevents or helps the control system 300 avoid winding up. In effect, the integral component produced by the filter 316 estimates the process response between the times (controller iterations) at which subsequent process variable feedback is received and, if the actual process variable response is as expected, when a new process variable measurement is received at the controller 300, then the integral component will zero out the value produced in the proportional path. If the expected response of the process is different than the actual process response during this time, then the integral component will cause a change in the control signal 326 to force movement of the actuator to thereby correct the position of the actuator.

In the past, such as in the systems described in U.S. Pat. Nos. 7,587,252 and 7,620,460, the reset contribution filter used in a feedback path of a non-periodically updated controller only calculated a new indication of an expected response when a new process variable measurement value was available. As a result, the reset contribution filter did not compensate for setpoint changes or feed-forward disturbances that occurred between receipt of process variable measurements because the setpoint changes or feed-forward disturbances were wholly independent from any measurement value updates. For example, if a setpoint change or feed-forward disturbance occurred between two measurement updates, the expected process response of the controller was likely to be distorted because the calculation of the new indication of the expected response was based on the time since the last measurement update and the current controller output 305. As a result, the filter 316 could not begin to account for the time changes in the process (or the control signal) that resulted from a setpoint change (or other feed-forward disturbance) that occurred between the receipt of two process variable measurement values at the controller.

As will be understood, however, the control routine 300 of FIG. 9 provides an expected process response by basing the calculations being performed on slow or non-periodic measurement values while, in addition, determining the expected response between the receipt of two measurement values to account for changes caused by a change in the setpoint (or any measured disturbance used as a feed-forward input to the controller 300). Thus, the control technique described above is able to accommodate for setpoint changes, feed-forward action on measured disturbances, etc., that may affect the expected process response and thus provide a more robust control response. Moreover, this control technique, because it avoids windup in the controller, is able to operate effectively when the process variable measurement feedback rate is equal to or even less than the inverse of the process response time (i.e., when the times between feedback measurements being received at the controller is greater than the process response time).

As will be understood, the control technique illustrated in FIG. 9 calculates an indication of an expected response via the continuously updated filter 316 (e.g. the reset contribution filter) for each execution of the control block or routine 300. Here, the controller 300 configures the continuously updated filter 316 to calculate a new indication of an expected response for each execution of the control block. However, to determine if the output of the filter 316 should be used as an input to the summing block 312, the communications stack 380 and, in some examples, the update detection module 82 (FIG. 3), processes the incoming data from the transmitter 306 to generate a new value flag for the integral output switch 318 and for the summer 326 when a new process variable measurement value is received. This new value flag informs the switch 318 to sample and clamp the filter output value for this controller iteration to the input of the summer 312. Otherwise, the switch 318 provides a zero (0.0) value to the summer 312 as the integral contribution value.

Regardless of whether a new value flag is communicated, the continuously updated filter 316 continues to calculate an indication of an expected response for each iteration of the control routine. This new indication of an expected response is delivered to the integral output switch 318 each execution of the control block. Depending on the presence of the new value flag, the integral output switch 318 switches between allowing the new indication of the expected response from the continuously updated filter 316 to pass through to the summing block 312 or maintaining a zero value at the input to the summing block 312. More particularly, when a new value flag is communicated, the integral output switch 318 allows the most recently or currently calculated indication of the expected response from the continuously updated filter 316 to pass to the summing block 312. Conversely, if the new value flag is not present, then the integral output switch 318 provides a zero value to the summer 312.

After or when a new process variable measurement value is received at the process controller 300, and the output R of the continuous filter 316 is used in the summer 312, then the time since the last communication is set to zero (0) and the continuous filter output R is set to zero. Likewise, the output of the summer 322 is set to zero (0). Moreover, in these situations, the summer 312 may subtract the continuous filter output R from the output of the block 320 to generate the new control signal 326 depending on the manner or order in which the block 320 performs a difference calculation.

This control technique allows the continuously updated filter 316 to continue to model the expected process response regardless of whether a new measurement value is communicated. If the control output changes as a result of a setpoint change or a feed-forward action based on a measured disturbance, irrespective of the presence of a new value flag, the continuously updated filter 316 reflects the expected process response by calculating a new indication of an expected response at each control routine iteration. However, the new indication of the expected response (i.e. the reset contribution or integration component) will only be incorporated into the controller output signal calculations when a new value flag is communicated (via the integral output switch 318), which prevents or lessens controller windup in response to slowly received process variable measurements at the controller 300.

It should be noted that the simple PI controller configuration of FIG. 9 uses the output of the filter 316 directly as the reset contribution to the control signal, and in this case the reset contribution of a closed-loop control routine (e.g. the continuously updated filter equation presented above) may provide an accurate representation of the process response in determining whether the process exhibits steady-state behavior. However, other processes, such as deadtime dominant processes, may require the incorporation of additional components in the controller of FIG. 9, such as those illustrated in FIGS. 5 and 6, by including a deadtime unit in the integral calculation path, in order to model the expected process response. With regard to processes that are well represented by a first-order model, the process time constant may generally be used to determine the reset time for the PI (or PID) controller. More specifically, if the reset time is set equal to the process time constant, the reset contribution generally cancels out the proportional contribution such that, over time, the control routine 300 reflects the expected process response. In the example illustrated in FIG. 9, the reset contribution may be effected by a positive feedback network having a filter with the same time constant as the process time constant. While other models may be utilized, the positive feedback network, filter, or model provides a convenient mechanism for determining the expected response of a process having a known or approximated process time constant. For those processes that require PID control, the derivative contribution, also known as rate, to the PID output may also be recomputed and updated only when a new measurement is received. In those cases, the derivative calculation may use the elapsed time since the last new measurement. An example of a controller that may use other controller components to control more complex processes using non-periodic receipt of process measurements, but that may use the filtering technique of FIG. 9 to provide for robust control in response to setpoint changes will be described below in conjunction with FIG. 10.

Figure 10:
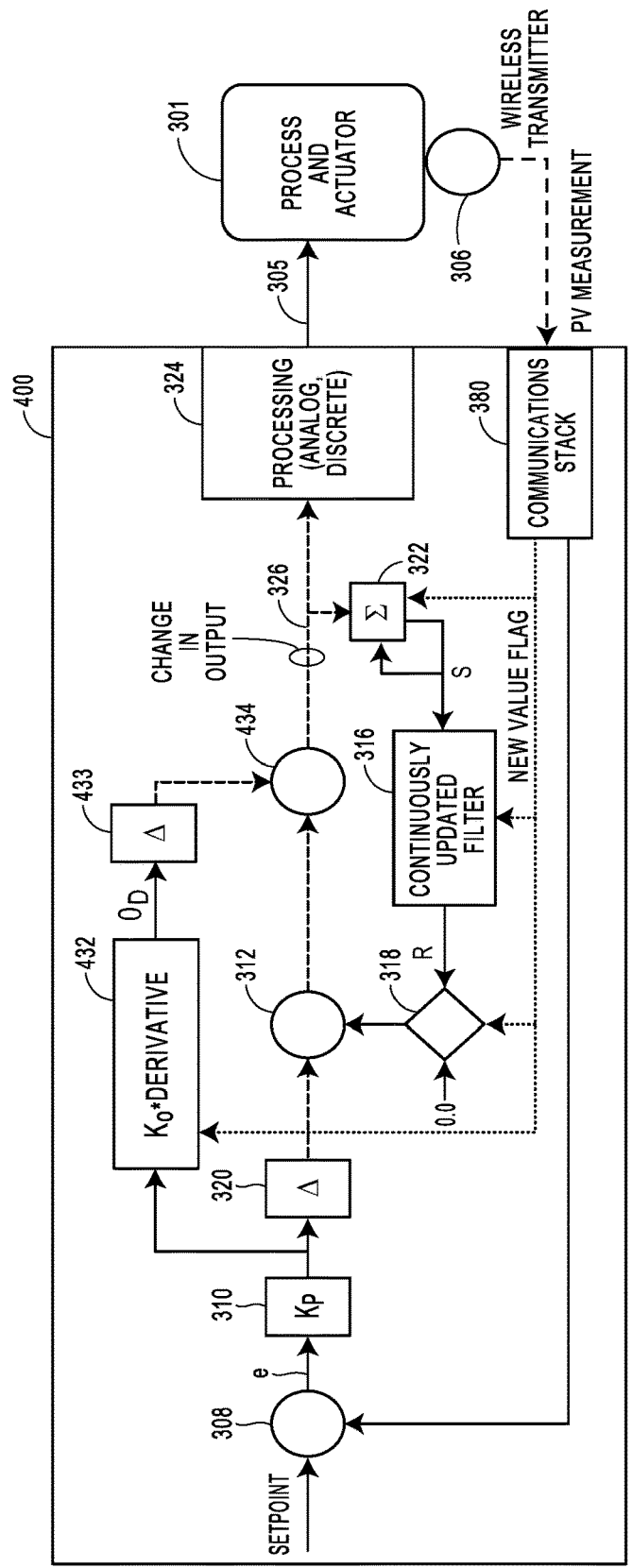
FIG. 10 is a block diagram of an example velocity based PID controller that allows for robust compensation of setpoint changes or feed-forward disturbances in a process control system in response to slowly received process variable measurement signals.

In particular, FIG. 10 depicts an alternative controller (or control element) 400 that differs from the controller 300 described above in FIG. 9 in that a derivative, or rate, contribution component is incorporated into the controller 400. By incorporating the derivative contribution, the control routine implemented by the controller 400 includes an additional feedback mechanism such that, in some cases, a proportional-integral-derivative (PID) control scheme is implemented.

The control routine or technique of FIG. 10 includes a derivative contribution that is configured in a manner similar to that described above in connection with the systems of FIGS. 7 and 8 to accommodate slow, non-periodic, or otherwise unavailable updates of the process variable measurement. The derivative contribution may be restructured to be based on the elapsed time since the last measurement update. In this manner, a spike in the derivative contribution (and the resultant output signal) is avoided. More particularly, the derivative contribution in the system of FIG. 10 is determined by a derivative block 432 that receives the error signal (multiplied by the proportional gain $K_P$) from the gain block 310 in parallel with the elements dedicated to the proportional and integral contributions, and operates to produce a derivative control component $O_D$ which is then provided to a change block 433. The change block 433 determines the change in the derivative control component $O_D$ since the last controller iteration and provides this change value to a summer 434, which sums or adds this change in the derivative control component to the output of the summer 312 to produce the change in the control signal. In this case, the summer 322 in the integral contribution calculation path is connected to the output of the summer 434. However, the components of FIG. 10 also illustrated in FIG. 9 operate in the manner as described with respect to FIG. 9. Here it will be seen that the derivative block 432 operates to calculate a new derivative component $O_D$ only during controller iterations at which a new value flag is received therein (indicating a new value of the process variable measurement has been received at the controller). This operation, in effect, keeps the output of the change block 434 zero for all controller iterations during which or at which a new process variable measurement is not received at the controller 400.

To accommodate unreliable transmissions and, more generally, the unavailability of measurement updates, the derivative contribution $O_D$ is maintained at the last determined value until a measurement update is received, as indicated by the new value flag from the communications stack 380. This technique allows the control routine to continue with periodic execution according to the normal or established execution rate of the control routine. Upon reception of the updated measurement, the derivative block 432, as illustrated in FIG. 10, may determine the derivative contribution in accordance with the following equation:

$$O_D = K_p K_D \cdot \frac{e_N - e_{N-1}}{\Delta T}$$

where $e_N$=Current error
$E_{N-1}$=Last error
$\Delta T$=Elapsed time since a new value was communicated
$O_D$=Controller derivative term
$K_P$=Proportional gain factor
$K_D$=Derivative gain factor Of course, if desired, the derivative component calculation block 432 may be connected directly to the output of the summer 308 to receive the error signal and the derivative gain term $K_D$ may be set to incorporate a derivative gain with the proportional gain $K_P$. With this technique for determining the derivative contribution, the measurement updates for the process variable (i.e., control input) can be lost or not available for one or more execution consecutive periods without the production of output spikes, which enables bumpless recovery. When the communication is reestablished, or a new process variable measurement value is received at the controller, the term $(e_N-e_{N-1})$ in the derivative contribution equation may generate the same value as that generated in the standard calculation of the derivative contribution. However, for a standard PID technique, the divisor in determining the derivative contribution is the execution period. In contrast, the control technique utilizes the elapsed time between two successfully received measurements. With an elapsed time greater than the execution period, the control technique produces a smaller derivative contribution, and reduced spiking, than the standard PID technique.

To facilitate the determination of the elapsed time, the communications stack 80 may provide the new value flag described above to the derivative block 432 as shown in FIG. 10. Alternative examples may include or involve detection of a new measurement, or update, based on its value. Also, the process measurement may be used in place of the error in the calculation of the proportional or derivative component. More generally, the communication stack 380 may include or incorporate any software, hardware or firmware (or any combination thereof) to implement a communications interface with the process 301, including any field devices within the process 301, process control elements external to the controller, etc. However, in the controller 400 of FIG. 10, the continuously updated filter 316 and the switch module 318 operate the same as described above with respect to the controller 300 of FIG. 9 to provide for robust control in response to setpoint changes.

Practice of the control methods, system and techniques described herein is not limited to any one particular wireless architecture or communication protocol. Suitable exemplary architectures and communication support schemes are described U.S. patent application Ser. No. 11/156,215 entitled "Wireless Architecture and Support for Process Control Systems," which was filed on Jun. 17, 2005, the entire disclosure of which is hereby incorporated by reference. In fact, the modifications to the control routines are well-suited for any context in which the control routine is implemented in a periodic manner, but without process variable measurement updates for each control iteration. Other exemplary contexts include where a sampled value is provided irregularly or more seldom by, for instance, an analyzer or via lab samples.

Practice of the control technique is not limited to use with single-input, single-output PID control routines (including PI and PD routines), but rather may be applied in a number of different multiple-input and/or multiple-output control schemes and cascaded control schemes. More generally, the control technique may also be applied in the context of any closed-loop model-based control routine involving one or more process variables, one or process inputs or other control signals, such as model predictive control (MPC).

Figure 11A:
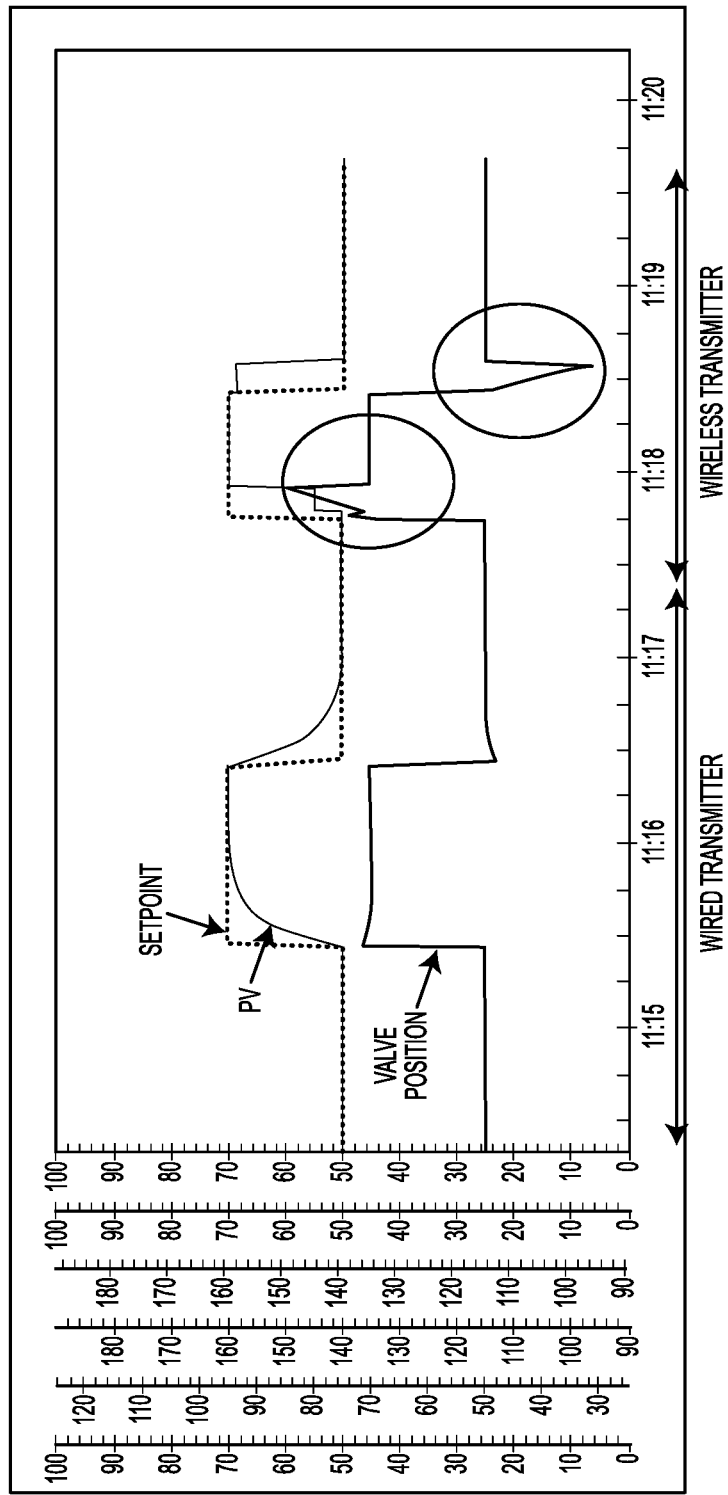
FIG. 11A is a graph illustrating the simulated process response of an example prior art velocity based PID controller in both a wired and a wireless configuration in response to a setpoint change in the primary control variable and with a process response time of 8 seconds.
Figure 11B:
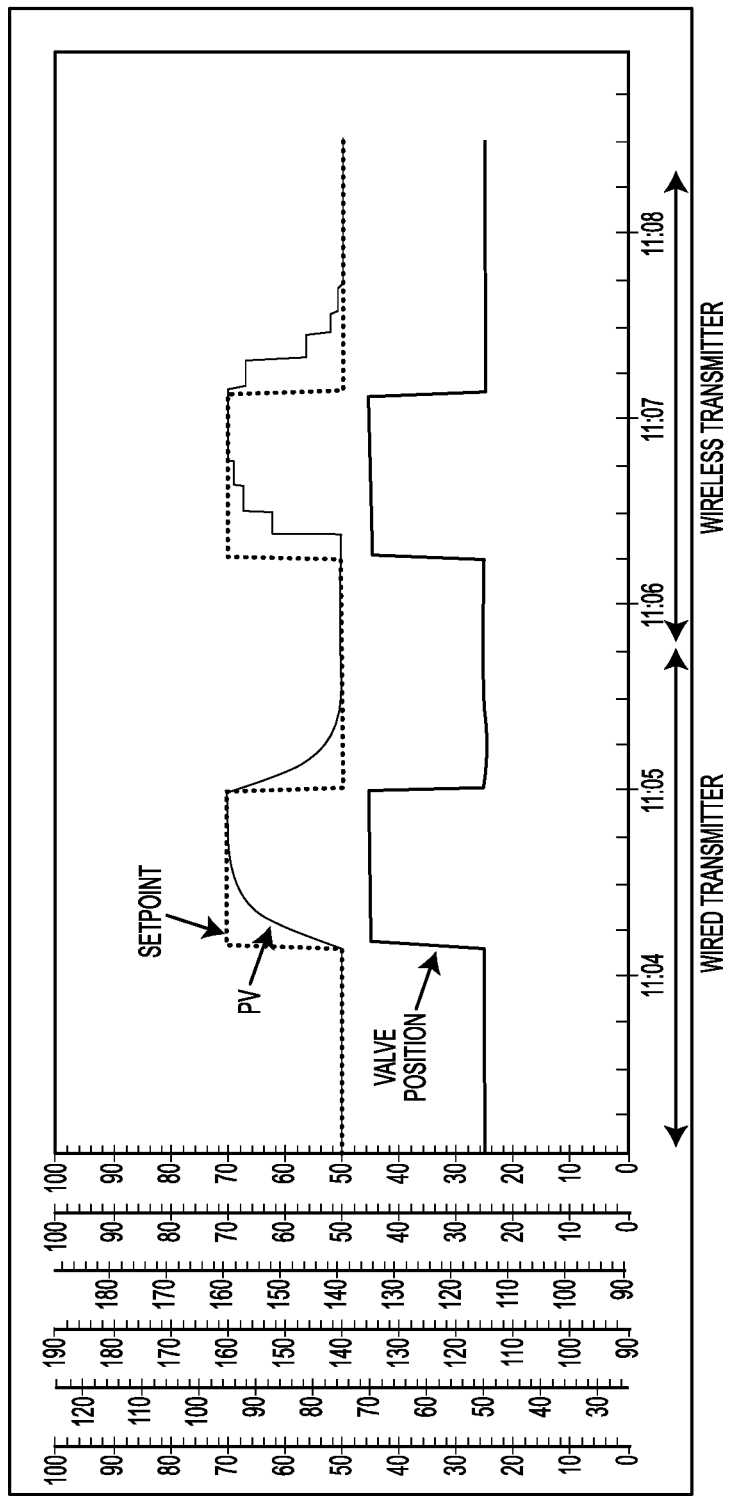
FIG. 11B is a graph illustrating the simulated process response of an example velocity based PID controller according to the present invention in both a wired and a wireless configuration in response to a setpoint change in the primary control variable and with a process response time of 8 seconds.
Figure 12B:
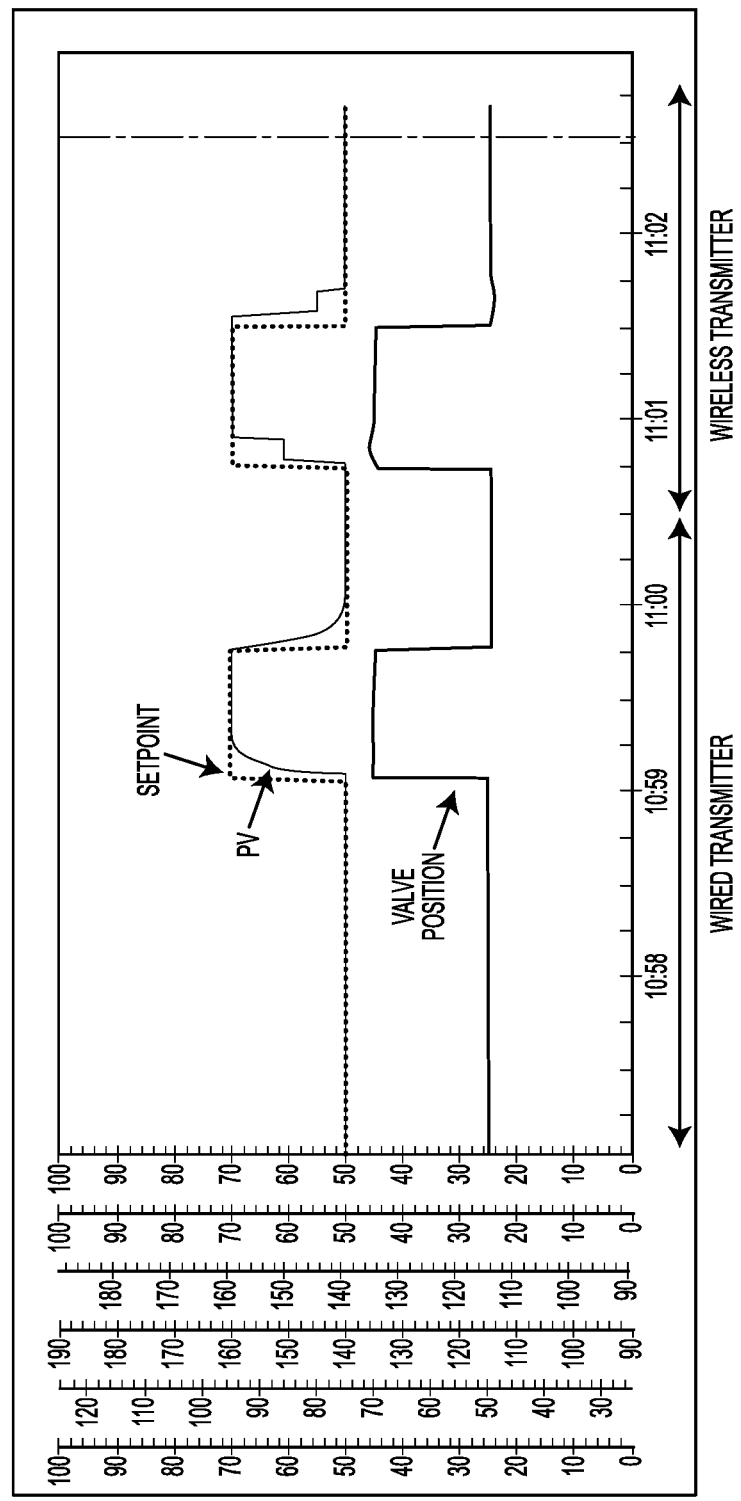
FIG. 12B is a graph illustrating the simulated process response of an example velocity based PID controller according to the present invention in both a wired and a wireless configuration in response to a setpoint change in the primary control variable and with a process response time of 3 seconds.
Figure 13B:
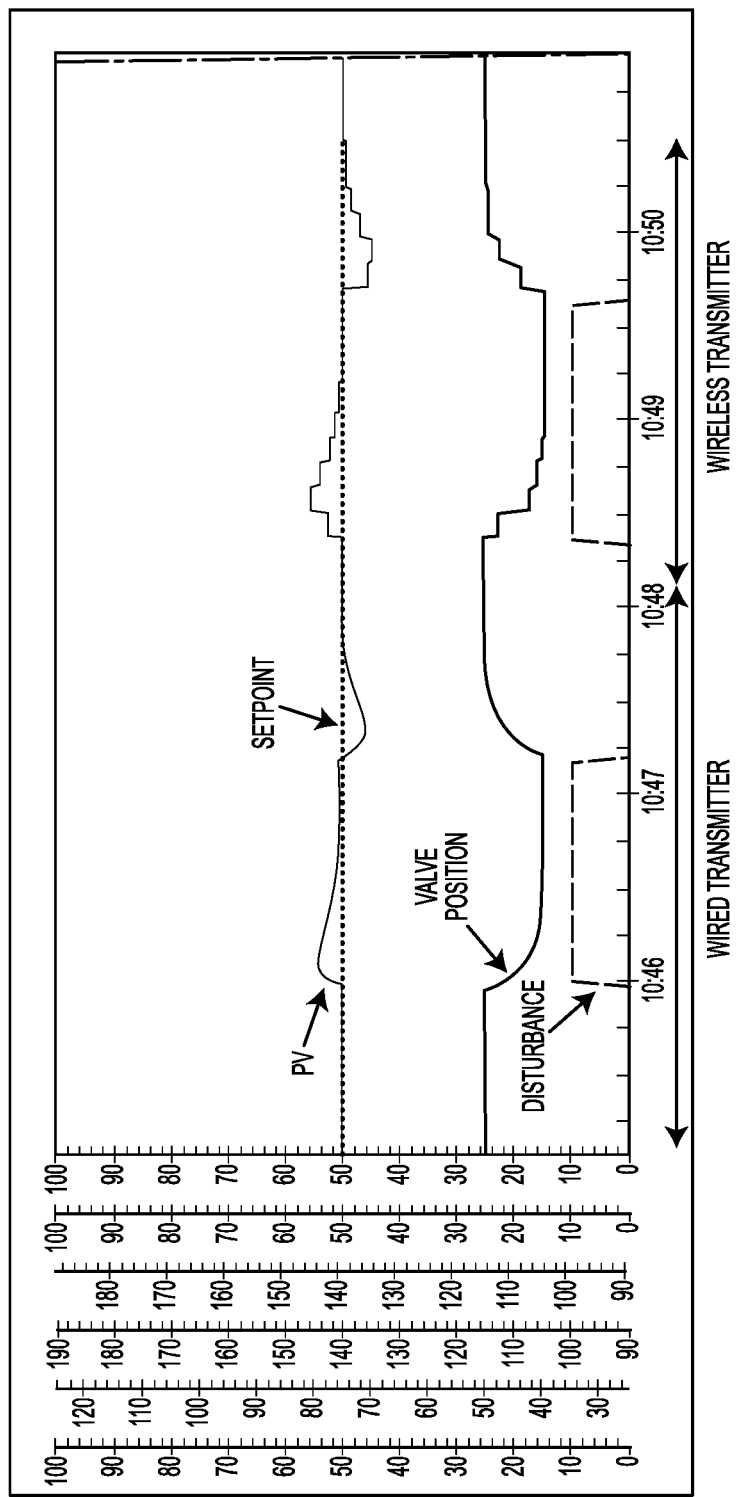
FIG. 13B is a graph illustrating the simulated process response of an example velocity based PID controller according to the present invention in both a wired and a wireless configuration in response to a disturbance change and with a process response time of 8 seconds.
Figure 14A:
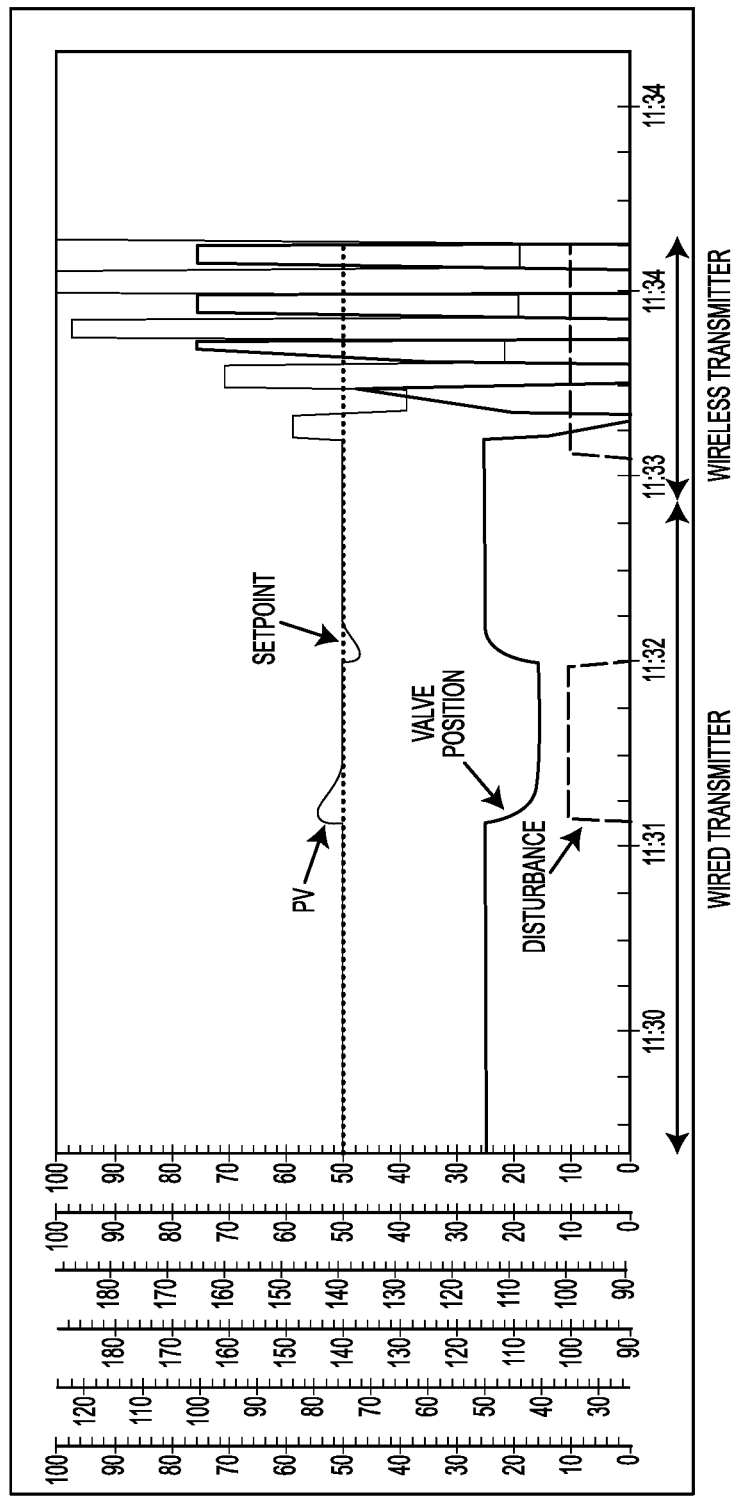
FIG. 14A is a graph illustrating the simulated process response of an example prior art velocity based PID controller in both a wired and a wireless configuration in response to a disturbance change and with a process response time of 3 seconds.
Figure 14B:
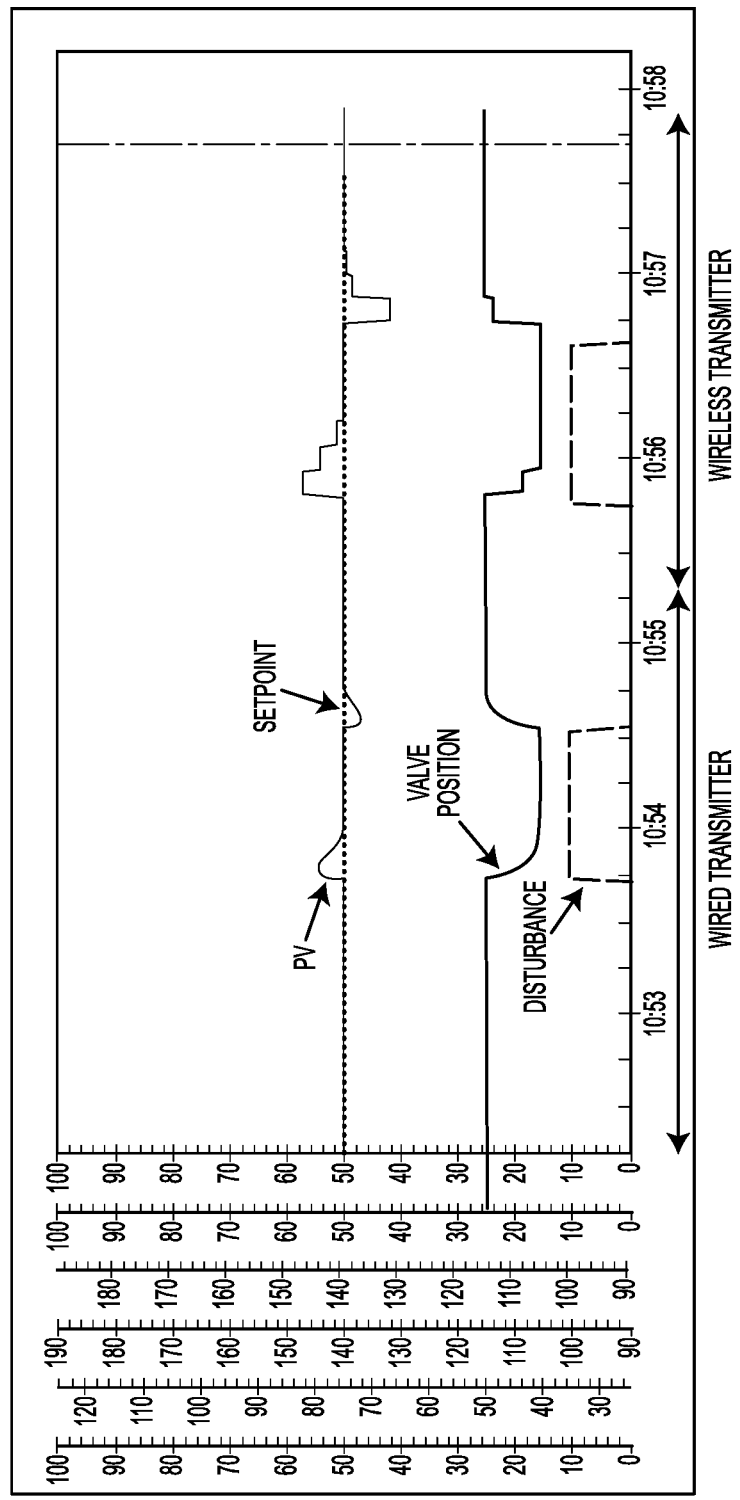
FIG. 14B is a graph illustrating the simulated process response of an example velocity based PID controller according to the present invention in both a wired and a wireless configuration in response to a disturbance change and with a process response time of 3 seconds.

FIGS. 11-14 provide graphical depictions of simulated operation of the control routines described herein (in particular that of FIG. 10) as compared to a prior art controller using a standard velocity form of a PID control algorithm to illustrate the effectiveness of the present control routine in situations in which the process response time is similar to, or even less than the time between updates of the measurement of the controlled process variable. The graphs of FIGS. 11-14 illustrate simulated control examples using primary control only although other types of control could be used, such as override control. Generally speaking, each of the graphs in FIGS. 11A, 12A, 13A, and 14A illustrates the operation of the standard, prior art velocity based PID control algorithm using both a wired feedback configuration (which operation is illustrated on the left side of the graph) in which a new process variable measurement value is available during each controller iteration, and a wireless configuration (which operation is illustrated on the right side of the graph). FIGS. 11A and 13A, however, illustrate control situations in which the feedback rate or time between process variable measurements is 8 seconds and in which the process response time is 8 seconds, while FIGS. 12A and 14A illustrate the operation of the prior art controller in which the feedback rate or time between process variable measurements is 8 seconds and in which the process response time is 3 seconds. Likewise, FIGS. 11 and 12 illustrate the controller operation in response to setpoint changes while FIGS. 13 and 14 illustrate the operation of these same controllers in response to a disturbance changes. For comparison, the graphs of FIGS. 11B, 12B, 13B, and 14B, illustrate the operation of the velocity based PID algorithm described herein in the same process control situations as those of FIGS. 11A, 12A, 13A, and 14A, respectively.

Generally speaking, the following parameters were used in the simulated control operations depicted in FIGS. 11-14, and these tests were run for wired and wireless inputs and for changes in setpoint and unmeasured disturbances as explained above. The control and process simulation used in the test were setup as follows:
Test for Process Response of 8 Seconds
  Primary Processes (Same Gain and Dynamics)
    Process Gain=1

Process Time Constant=8 seconds
Process Deadtime=0 seconds
PID Tuning for Primary (Lambda Factor 1.0)
Proportional Gain=1
Integral Gain=7.5 repeats/min
Test for Process Response of 3 Seconds
Primary Process (Same Gain and Dynamics)
Process Gain=1
Process Time Constant=3 seconds
Process Deadtime=0 seconds
PID Tuning for Primary (Lambda Factor 1.0)
Proportional Gain=1
Integral Gain=20 repeats/min
Module Execution Rate
0.5 sec for all tests
Wireless Communication Update Rate
8 sec periodic for all tests
Disturbance Input
Only impacts primary measurement
Gain=1

As illustrated in FIGS. 11A and 13A, the prior art velocity based PID control algorithm operates somewhat satisfactorily in response to setpoint changes (FIG. 11A) and for disturbance changes (FIG. 13A) in both a wired configuration and in a wireless configuration in which the process response time is equal to the interval between process variable measurements (both are set to 8 seconds). However, as indicated by the circled parts of the graphs of FIGS. 11A and 13A, this control technique causes the valve position to undergo significant variations during the response during wireless control. As illustrated in FIGS. 11B and 13B, the current control technique described herein operates a bit better in these situations (setpoint change in FIG. 11B and disturbance change in FIG. 13B) and very similarly to the operation of the wired configuration.

However, as illustrated in FIGS. 12A and 14A, the prior art velocity based PID controller operates very poorly and, in fact, becomes unstable, during wireless control in response to both setpoint changes and disturbance changes when the process response time is 3 seconds and the process variable update rate is 8 seconds. However, as illustrated in FIGS. 12B and 14B, the current velocity based control routine still operates very satisfactorily in these situations, illustrating the effectiveness of the currently described control routine when the process variable measurement update interval time is greater than (longer than) and even significantly greater than (e.g., 2-4 times) the process response time.

The term "field device" is used herein in a broad sense to include a number of devices or combinations of devices (i.e., devices providing multiple functions, such as a transmitter/actuator hybrid), as well as any other device(s) that perform(s) a function in a control system. In any event, field devices may include, for example, input devices (e.g., devices such as sensors and instruments that provide status, measurement or other signals that are indicative of process control parameters such as, for example, temperature, pressure, flow rate, etc.), as well as control operators or actuators that perform actions in response to commands received from controllers and/or other field devices such as valves, switches, flow control devices, etc.

It should be noted that any control routines or modules described herein may have parts thereof implemented or executed in a distributed fashion across multiple devices. As a result, a control routine or module may have portions implemented by different controllers, field devices (e.g., smart field devices) or other devices or control elements, if so desired. Likewise, the control routines or modules described herein to be implemented within the process control system may take any form, including software, firmware, hardware, etc. Any device or element involved in providing such functionality may be generally referred to herein as a "control element," regardless of whether the software, firmware, or hardware associated therewith is disposed in a controller, field device, or any other device (or collection of devices) within the process control system. A control module may be any part or portion of a process control system including, for example, a routine, a block or any element thereof, stored on any computer readable medium. Such control modules, control routines or any portions thereof (e.g., a block) may be implemented or executed by any element or device of the process control system, referred to herein generally as a control element. Control routines, which may be modules or any part of a control procedure such as a subroutine, parts of a subroutine (such as lines of code), etc., may be implemented in any desired software format, such as using object oriented programming, using ladder logic, sequential function charts, function block diagrams, or using any other software programming language or design paradigm. Likewise, the control routines may be hard-coded into, for example, one or more EPROMs, EEPROMs, application specific integrated circuits (ASICs), or any other hardware or firmware elements. Still further, the control routines may be designed using any design tools, including graphical design tools or any other type of software/hardware/firmware programming or design tools. Thus, the controller 11 may be configured to implement a control strategy or control routine in any desired manner.

Alternatively or additionally, the function blocks may be stored in and implemented by the field devices themselves, or other control elements of the process control system, which may be the case with systems utilizing Fieldbus devices. While the description of the control system is provided herein using a function block control strategy, the control techniques and system may also be implemented or designed using other conventions, such as ladder logic, sequential function charts, etc. or using any other desired programming language or paradigm.

When implemented, any of the software described herein may be stored in any computer readable memory such as on a magnetic disk, a laser disk, or other storage medium, in a RAM or ROM of a computer or processor, etc. Likewise, this software may be delivered to a user, a process plant or an operator workstation using any known or desired delivery method including, for example, on a computer readable disk or other transportable computer storage mechanism or over a communication channel such as a telephone line, the Internet, the World Wide Web, any other local area network or wide area network, etc. (which delivery is viewed as being the same as or interchangeable with providing such software via a transportable storage medium). Furthermore, this software may be provided directly without modulation or encryption or may be modulated and/or encrypted using any suitable modulation carrier wave and/or encryption technique before being transmitted over a communication channel.

While the present invention has been described with reference to specific examples, which are intended to be illustrative only and not to be limiting of the invention, it may be apparent to those of ordinary skill in the art that changes, additions or deletions may be made to the control techniques without departing from the spirit and scope of the invention.

The invention claimed is:

1. A method of controlling a process, comprising:
   implementing, on a computer processing device, multiple iterations of a control routine to generate a control signal including, during each iteration of the control routine;
   generating, using a computer processing device, an integral feedback contribution for use in producing the control signal, including using, during each of the multiple iterations including a current iteration, a continuously updated iterative filter to determine a current integral feedback contribution value for the current iteration of the control routine from an integral feedback contribution value of a preceding iteration of the control routine and a value of the control signal;
   using, as determined by a switch coupled to the continuously updated iterative filter, the current integral feedback contribution to generate the control signal for the current iteration of the control routine during each controller iteration at which a new process response indication is received, and not using, as determined by the switch, the current integral feedback contribution to generate the control signal during controller iterations at which a new process response indication to the control signal is not received; and
   using the control signal to control the process.

2. The method of claim 1, further including generating a proportional contribution during each iteration and using the proportional contribution during each iteration to generate the control signal.

3. The method of claim 1, wherein the new process response indication is a measurement of a process parameter being affected by the control signal.

4. The method of claim 3, wherein the process parameter is a process variable controlled by a field device that is responsive to the control signal.

5. The method of claim 1, wherein determining the integral feedback contribution includes generating the integral feedback contribution value based on the difference between the control signal for the current iteration of the control routine and the integral feedback contribution value of the preceding iteration of the control routine multiplied by a factor dependent on a reset time and a controller execution period.

6. The method of claim 1, wherein implementing multiple iterations of a control routine to generate a control signal includes, during each iteration of the control routine, generating the control signal based on a setpoint value, a most recent measurement of a process variable and the integral feedback contribution.

7. The method of claim 1, wherein implementing multiple iterations of a control routine to generate a control signal includes, during each iteration of the control routine, generating a proportional component from a setpoint value, a most recently received process response indication, and a proportional gain value, and generating the control signal using a difference between the proportional component generated during the current iteration and the proportional component generated during a previous iteration.

8. The method of claim 7, wherein generating the integral feedback contribution for use in producing the control signal includes determining a current integral feedback contribution value for the current iteration of the control routine from an integral feedback contribution value of a preceding iteration of the control routine and a summed value of the control signal for all previous iterations since the last iteration at which a new process response indication was received.

9. The method of claim 1, wherein generating the integral feedback contribution for use in producing the control signal includes determining a current integral feedback contribution value for the current iteration of the control routine from an integral feedback contribution value of a preceding iteration of the control routine and a summed value of the control signal for all previous iterations since the last iteration at which a new process response indication was received.

10. A process controller that generates a control signal for controlling a process variable during each of a multiplicity of controller iterations of the process controller, comprising:
    a communications unit that receives a new value of the process variable at less than each of the multiplicity of iterations of the process controller;
    a proportional control component that generates a proportional control signal value during each of the iterations of the process controller including,
    a first summer that determines a difference between a set point value for the process variable and a received value of a process variable, and
    a proportional gain unit coupled to the summer;
    an integral control component that generates an integral control signal value during each of the iterations of the process controller including,
    a continuously updated iterative filter that determines a preliminary integral control component during each iteration of the process controller based on a previous value of the preliminary integral control component generated during a previous iteration of the process controller and based on the control signal for the current iteration of the process controller;
    a switch coupled to the continuously updated iterative filter that receives the preliminary integral control component and a further value, wherein the switch operates to provide the preliminary integral control component generated by the continuously updated iterative filter during process controller iterations associated with the receipt of a new value of the process variable at the communications unit as the integral control signal value and that provides the further value as the integral control signal value during controller iterations that are not associated with the receipt of a new value of the process variable at the communications unit; and
    a second summer that sums the proportional control signal value and the integral control signal value during each process controller iteration to produce the control signal.

11. The process controller of claim 10, further including a control signal conversion unit coupled to the second summer that converts the control signal to an output control signal to be sent to control a device within a process.

12. The process controller of claim 11, wherein the control signal represents a change in the output control signal to be sent to the process.

13. The process controller of claim 10, further including a derivative control component that determines a derivative control signal value, the derivative control component including a derivative gain unit coupled to the first summer, and a second difference unit coupled to the derivative gain unit that determines a further difference value between the output of the derivative gain unit from a previous controller iteration and the output of the derivative gain unit at the current controller iteration and provides the further difference to the second summer as the derivative control signal value, and wherein the second summer sums the derivative control signal value with the integral control signal value and the proportional control signal value to produce the control signal.

14. The process controller of claim 10, wherein the further value is an integral control signal value output by the switch in a previous controller iteration.

15. The process controller of clam 10, wherein the integral control component further includes a third summer coupled to the iterative filter, wherein the third summer sums the control signal for previous controller iterations to produce a summed control signal value and wherein the third summer provides the summed control signal value as an input to the iterative filter.

16. The process controller of claim 15, wherein the third summer resets the summed control signal upon receipt of a new value of the process variable at the communications unit.

17. The process controller of claim 16, wherein the third summer resets the summed control signal to zero upon receipt of a new value of the process variable at the communications unit.

18. The process controller of claim 15, wherein the further value is zero.

19. The process controller of claim 15, wherein the proportional control component includes a difference unit coupled to the proportional gain unit.

20. The process controller of claim 19, wherein the difference unit is coupled between the proportional gain unit and the second summer and determines a difference value between the output of the proportional gain unit from a previous controller iteration and the output of the proportional gain unit at the current controller iteration and provides the difference value as the proportional control signal value to the second summer.

21. A method of generating a velocity based process control signal during each of a multiplicity of iterations of a control routine, comprising:
receiving, via a computer processing device, a new value of the process variable being controlled at less than each the multiplicity of iterations of the control routine;
generating, using a computer processing device, during each of the multiplicity of iterations of the control routine, a difference based integral feedback contribution for use in producing the control signal, including summing the control signal generated during each iteration of the control routine since the last iteration of the control routine at which a new process variable value was received to produce a summed control signal, providing the summed control signal to a continuously updated iterative filter, and using, during each of the multiplicity of iterations, the continuously updated iterative filter to determine a current integral feedback contribution value for the current iteration of the control routine from an integral feedback contribution value of a preceding iteration of the control routine and the summed control signal; and
using, as determined by a switch coupled to the continuously updated iterative filter, the current integral feedback contribution value to generate the control signal for the current iteration of the control routine during each iteration at which a new process variable value is received, and not using, as determined by the switch, the current integral feedback contribution value to generate the control signal during iterations at which a new process variable value is not received from the process; and
using the control signal to control the process variable.

22. The method of generating a velocity based process control signal of claim 21, further including generating, using a computer processing device, a difference based proportional contribution during each of the iterations of the control routine and using the proportional contribution during each of the iterations of the control routine to generate the control signal.

23. The method of generating a velocity based process control signal of claim 21, wherein the new process variable value is a measurement of a process parameter being affected by the control signal.

24. The method of generating a velocity based process control signal of claim 21, wherein determining the integral feedback contribution includes generating the current integral feedback contribution value based on the difference between the summed control signal for the current iteration of the control routine and the integral feedback contribution value of the preceding iteration of the control routine multiplied by a factor dependent on a reset time and a controller execution period.

25. The method of generating a velocity based process control signal of claim 21, wherein not using the current integral feedback contribution value to generate the control signal during iterations at which a new process variable value is not received from the process includes using a fixed value as the current integral feedback contribution to generate the control signal during iterations at which a new process variable value is not received from the process.

26. The method of generating a velocity based process control signal of claim 21, wherein the fixed value is zero.

27. A velocity based process controller that generates a control signal for controlling a process variable during each of a multiplicity of controller iterations of the process controller, comprising:
a communications unit that receives a new value of the process variable at less than each of the multiplicity of iterations of the process controller;
an integral control component that generates an integral control signal value during each of the iterations of the process controller including,
a continuously updated iterative filter that determines a preliminary integral control component during each iteration of the process controller based on a previous value of the preliminary integral control component generated during a previous iteration of the process controller and based on the control signal for the current iteration of the process controller; and
a switch coupled to the continuously updated iterative filter that receives the preliminary integral control component and a further value, wherein the switch operates to provide the preliminary integral control component generated by the continuously updated iterative filter during process controller iterations associated with the receipt of a new value of the process variable at the communications unit as the integral control signal value and that provides the further value as the integral control signal value during controller iterations that are not associated with the receipt of a new value of the process variable at the communications unit; and a control signal generator coupled to receive the integral control signal value to generate a control signal for use in controlling the process during each of the controller iterations.

28. The velocity based process controller of claim 27, further comprising a proportional control component that generates a proportional control signal value during each of the iterations of the process controller including,
a first summer that determines a difference between a set point value for the process variable and a received value of the process variable, and
a proportional gain unit coupled to the summer; and
wherein the control signal generator includes a second summer that sums the proportional control signal value and the integral control signal value during each process controller iteration to produce the control signal.

29. The velocity based process controller of claim 28, wherein the proportional control component includes a difference unit coupled to the proportional gain unit.

30. The velocity based process controller of claim 29, wherein the difference unit is coupled between the proportional gain unit and the second summer and determines a difference value between the output of the proportional gain unit from a previous controller iteration and the output of the proportional gain unit at the current controller iteration and provides the difference value as the proportional control signal value to the second summer.

31. The process controller of claim 28, further including a derivative control component that determines a derivative control signal value, the derivative control component including a derivative gain unit coupled to the first summer, and a second difference unit coupled to the derivative gain unit that determines a further difference value between the output of the derivative gain unit from a previous controller iteration and the output of the derivative gain unit at the current controller iteration and provides the further difference to the second summer as the derivative control signal value, and wherein the second summer sums the derivative control signal value with the integral control signal value and the proportional control signal value to produce the control signal.

32. The velocity based process controller of clam 27, wherein the integral control component includes a further summer coupled to the iterative filter, wherein the summer sums the control signal for previous controller iterations to produce a summed control signal value and wherein the summer provides the summed control signal value as an input to the iterative filter.

33. The velocity based process controller of claim 32, wherein the summer resets the summed control signal upon receipt of a new value of the process variable at the communications unit.

34. The velocity based process controller of claim 32, wherein the summer resets the summed control signal to zero upon receipt of a new value of the process variable at the communications unit.

35. The velocity based process controller of claim 27, wherein the further value is zero.

36. The velocity based process controller of claim 27, further including a control signal conversion unit coupled to the control signal generator that converts the control signal produced by the control signal generator to an output control signal to be sent to control a device within a process.

37. The velocity based process controller of claim 36, wherein the control signal represents a change in the output control signal to be sent to the process.

* * * * *